(12) United States Patent
Sasai et al.

(10) Patent No.: US 9,924,162 B2
(45) Date of Patent: Mar. 20, 2018

(54) IMAGE DECODING METHOD INCLUDING SWITCHING A DECODING ORDER TO EITHER A FIXED PROCESSING ORDER OR AN ADAPTIVE PROCESSING ORDER

(71) Applicant: Panasonic Intellectual Property Corporation of America, Torrance, CA (US)

(72) Inventors: Hisao Sasai, Osaka (JP); Takahiro Nishi, Nara (JP); Youji Shibahara, Osaka (JP); Toshiyasu Sugio, Osaka (JP); Kyoko Tanikawa, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 1159 days.

(21) Appl. No.: 13/742,630

(22) Filed: Jan. 16, 2013

(65) Prior Publication Data
US 2013/0188685 A1    Jul. 25, 2013

Related U.S. Application Data

(60) Provisional application No. 61/588,209, filed on Jan. 19, 2012.

(51) Int. Cl.
| | | |
|---|---|---|
| H04N 11/20 | (2006.01) | |
| H04N 19/103 | (2014.01) | |
| H04N 19/176 | (2014.01) | |
| H04N 19/70 | (2014.01) | |
| H04N 19/129 | (2014.01) | |
| H04N 19/463 | (2014.01) | |
| H04N 19/157 | (2014.01) | |

(52) U.S. Cl.
CPC ..... *H04N 19/00018* (2013.01); *H04N 19/129* (2014.11); *H04N 19/157* (2014.11); *H04N 19/176* (2014.11); *H04N 19/463* (2014.11); *H04N 19/70* (2014.11)

(58) Field of Classification Search
USPC ....................................... 375/240.01–240.29
See application file for complete search history.

(56) References Cited

U.S. PATENT DOCUMENTS

| | | | |
|---|---|---|---|
| 2011/0293004 A1* | 12/2011 | An et al. | 375/240.13 |
| 2012/0082234 A1* | 4/2012 | Lou et al. | 375/240.18 |
| 2013/0003823 A1* | 1/2013 | Misra | H04N 19/129 375/240.02 |
| 2013/0089152 A1* | 4/2013 | Wang et al. | 375/240.23 |

OTHER PUBLICATIONS

ISO/IEC 14496-10 (MPEG-4 Part 10: Advanced Video Coding), Oct. 1, 2004.

(Continued)

*Primary Examiner* — Leron Beck
(74) *Attorney, Agent, or Firm* — Wenderoth, Lind & Ponack, L.L.P.

(57) ABSTRACT

An image decoding method for decoding a coded moving picture includes: switching a decoding order to either a fixed processing order or an adaptive processing order based on first information included in the coded moving picture; and decoding image data items included in the coded moving picture according to the decoding order switched to.

13 Claims, 33 Drawing Sheets

(56) References Cited

OTHER PUBLICATIONS

Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103_d2, 7th Meeting: Geneva, CH, Nov. 21-30, 2011, http://phenix.itsudparis.eu/jct/doc_enduser/documents/7_Geneva/wg11/JCTVC-G1103-v3.zip.

* cited by examiner

FIG. 1- PRIOR ART

| | Descriptor |
|---|---|
| ⋮ | ⋮ |
| log2_min_coding_block_size_minus3 | ue(v) |
| log2_diff_max_min_coding_block_size | ue(v) |
| ⋮ | ⋮ |

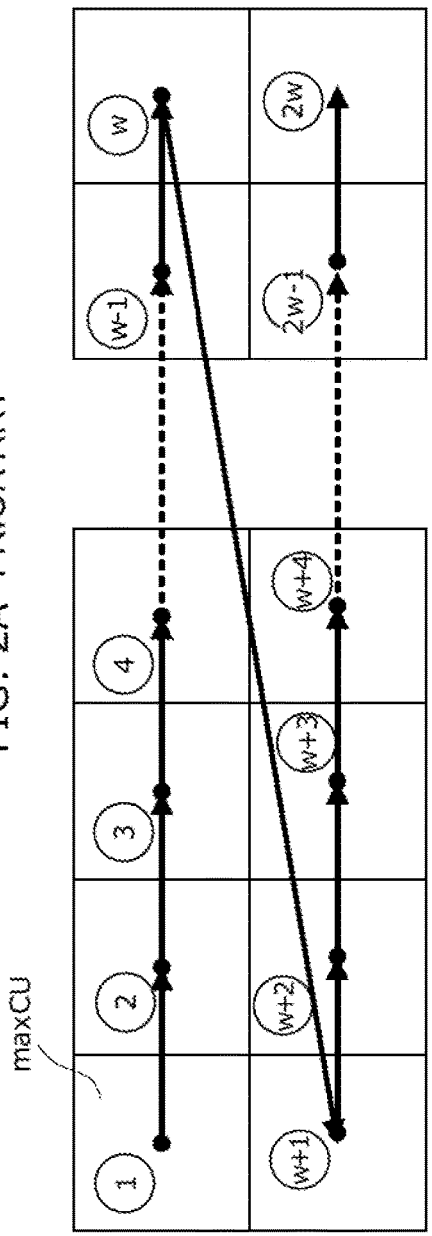
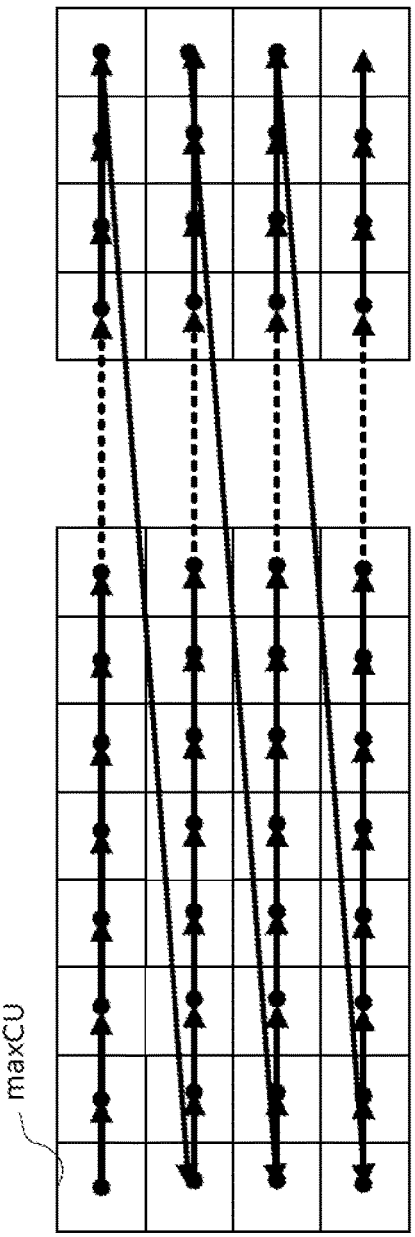
FIG. 2A - PRIOR ART
FIG. 2B - PRIOR ART

FIG. 3- PRIOR ART
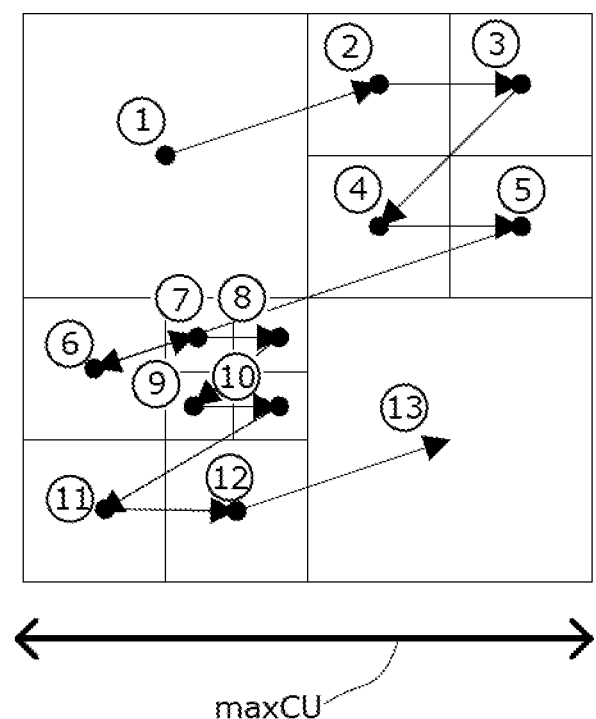

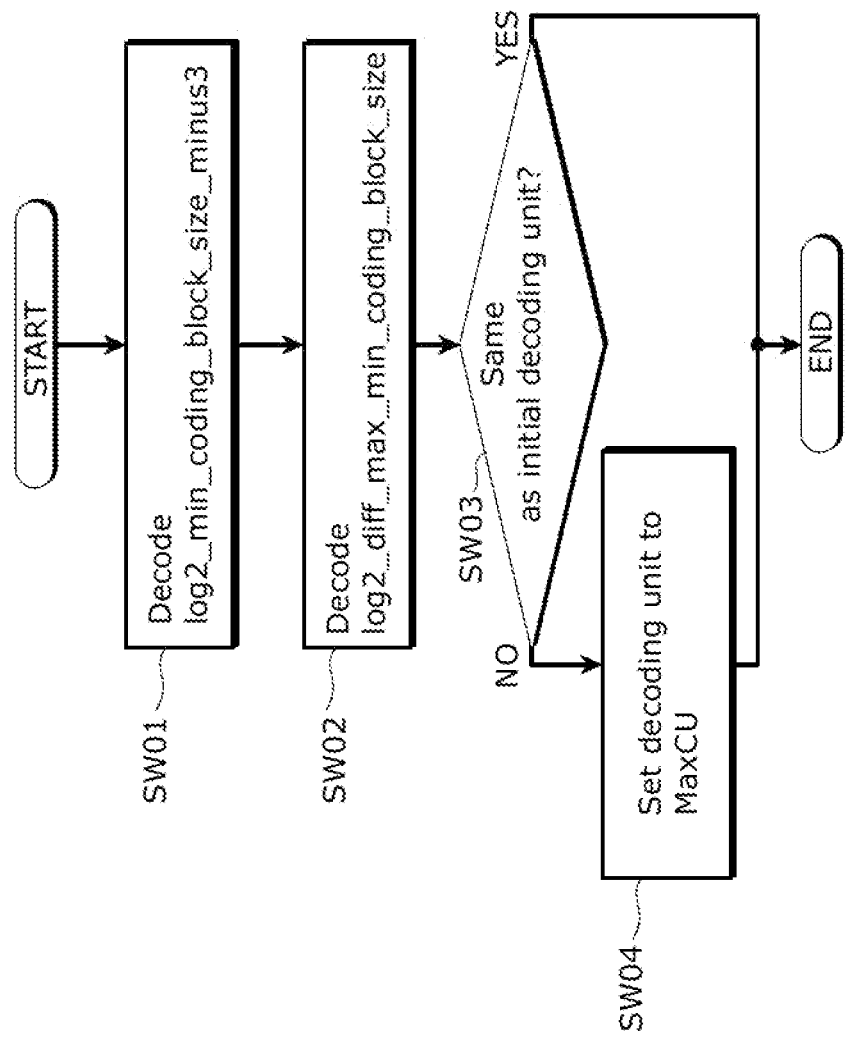
FIG. 4 - PRIOR ART

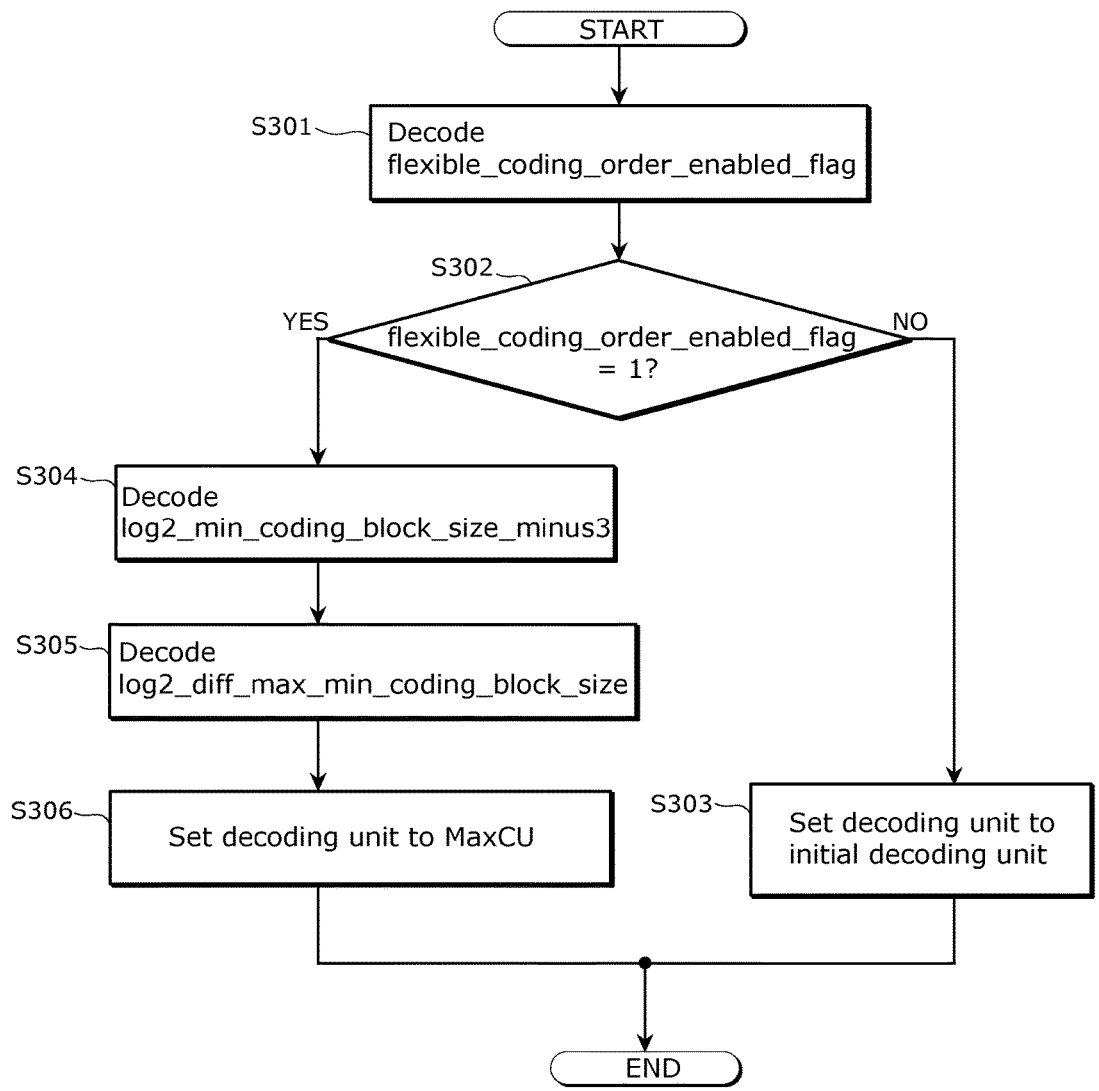

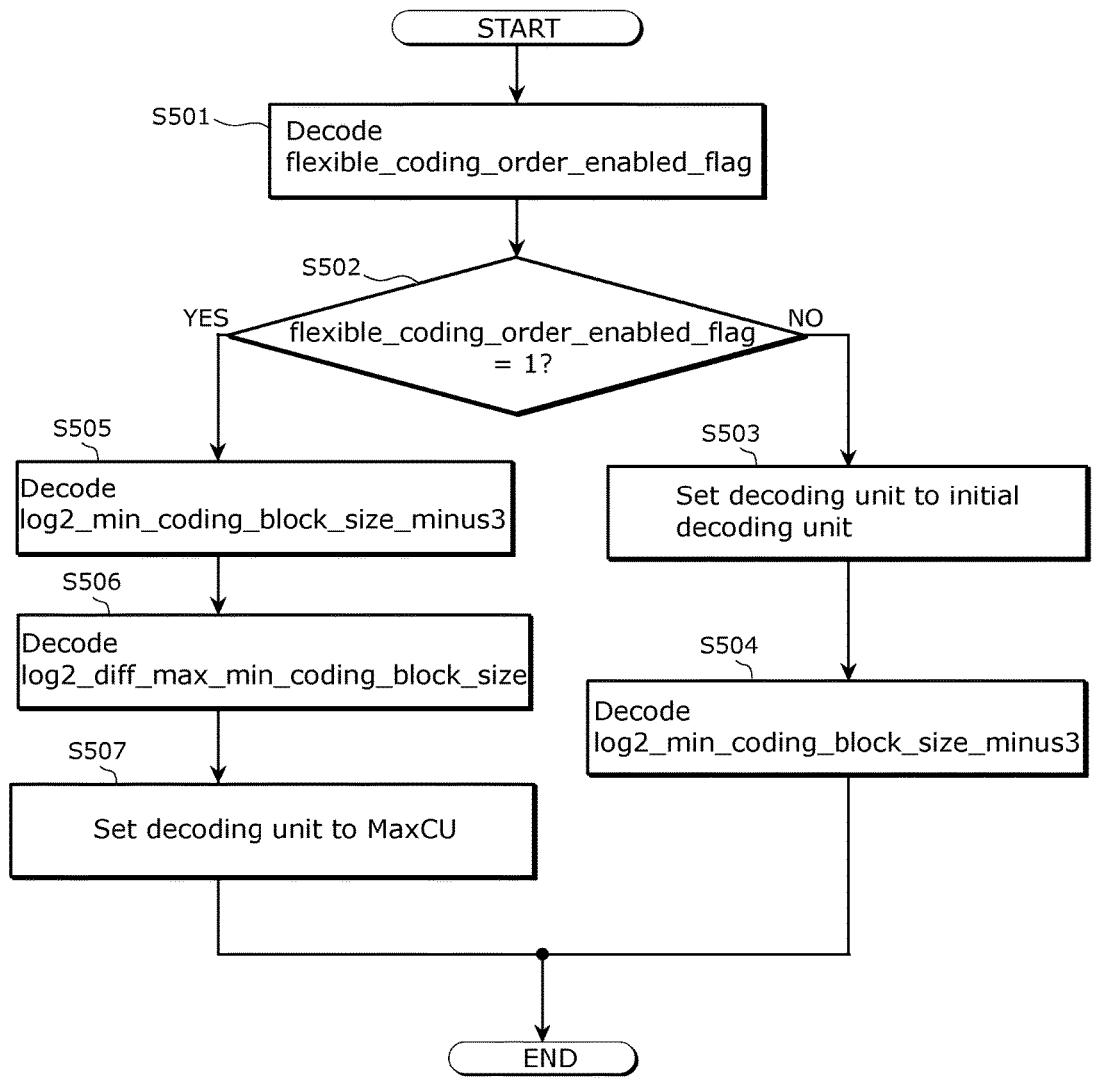

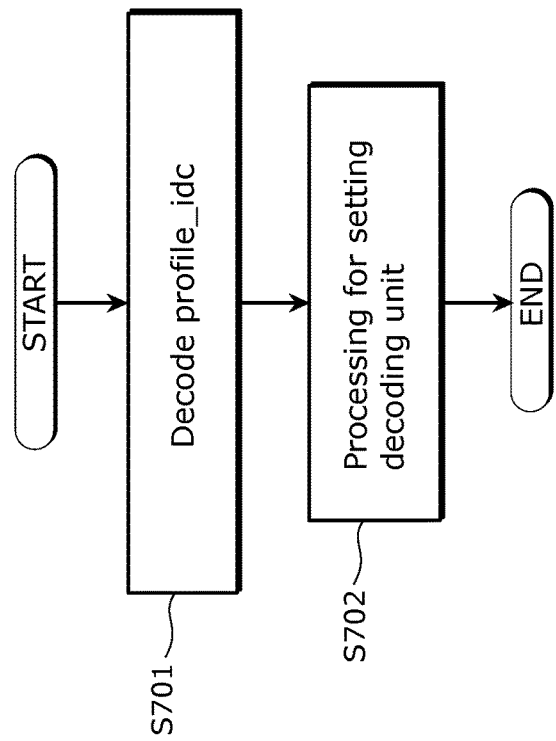

FIG. 25

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 28
Stream of TS packets
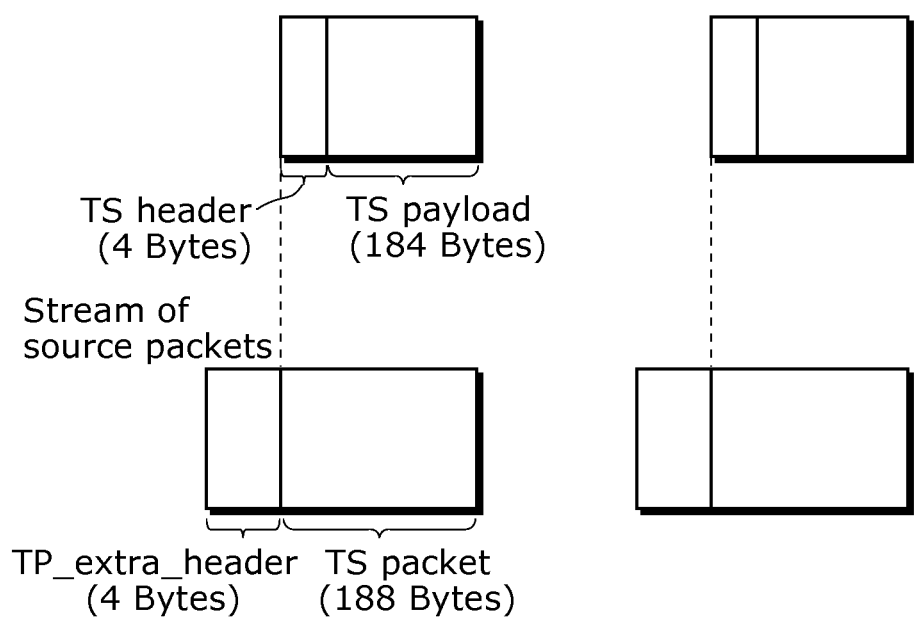
Multiplexed data
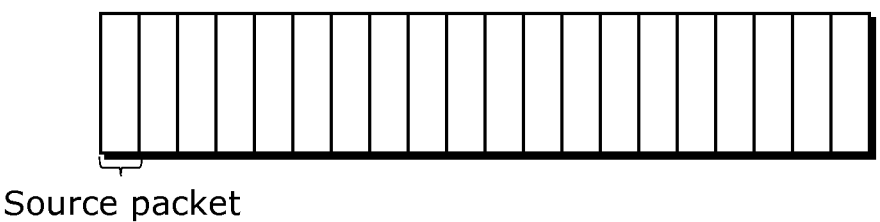

Data structure of PMT

FIG. 36

| Corresponding standard | Driving frequency |
|---|---|
| MPEG-4 AVC | 500 MHz |
| MPEG-2 | 350 MHz |
| ⋮ | ⋮ |

IMAGE DECODING METHOD INCLUDING SWITCHING A DECODING ORDER TO EITHER A FIXED PROCESSING ORDER OR AN ADAPTIVE PROCESSING ORDER

CROSS REFERENCE TO RELATED APPLICATION

The present application claims the benefit of U.S. Provisional Patent Application No. 61/588,209 filed on Jan. 19, 2012. The entire disclosure of the above-identified application, including the specification, drawings and claims is incorporated herein by reference in its entirety.

FIELD

The present disclosure relates to image coding methods, image decoding methods, image coding apparatuses, and image decoding apparatuses, and specifically to image coding methods, image decoding methods, image coding apparatuses, and image decoding apparatuses using arithmetic coding and arithmetic decoding.

BACKGROUND

Recent years have seen an increase in the number of applications for video on demand type services, such as video-conferencing through the Internet, digital video broadcasting, and streaming video content. These applications depend on transmission of video information. These applications require that such video data having a substantial amount of digital data is transmitted through conventional transmission channels having limited bandwidth or recorded on conventional recording media having limited data capacity. Accordingly, in order to transmit the video data using a conventional transmission channel or record the video data onto a conventional recording medium, compression or reduction of the amount of the video data is necessary.

Many video coding standards have been developed for the purpose of compressing video data. In conventional image coding methods represented by the International Telecommunication Union Telecommunication Standardization Sector (ITU-T) standards denoted as H.26x and the ISO/IEC standards denoted as MPEG-x, the screen is divided into predetermined units, and coding is performed on these units. For example, with H.264/MPEG-4 AVC (for example, see Non Patent Literature 1), the screen (picture) is processed in units called macro blocks, each of which constitutes a 16 by 16 pixel block.

In the coding and decoding processes, each of the plurality of processing units, macroblocks, are processed in order from the processing unit on the left side of the screen to the processing unit on the right side. It is to be noted that when each macroblock is further divided into smaller units called blocks, processing is performed on each block in a z-pattern, zigzag order.

In addition, in the High Efficiency Video Coding (HEVC) that is considered to be the next-generation image coding standard (see Non Patent Literature 2, for example), processing in units of mutually different sizes, from units of even larger blocks (64 by 64 pixels) to units of smaller blocks (8 by 8 pixels), is possible.

CITATION LIST

Non Patent Literature

[NPL 1]
ISO/IEC 14496-10 "MPEG-4 Part 10 Advanced Video Coding"

[NPL 2]
Joint Collaborative Team on Video Coding (JCT-VC) of ITU-T SG16 WP3 and ISO/IEC JTC1/SC29/WG11 7th Meeting: Geneva, CH, 21-30 Nov. 2011, JCTVC-G1103, "High Efficiency Video Coding (HEVC) text specification WorkingDraft5", http://phenix.it-sudparis.eu/jct/doc_end_user/documents/7_Geneva/wg11/JCTVC-G1103-v3.zip

SUMMARY

Technical Problem

However, there is a problem with the above Non Patent Literature that coding efficiency decreases.

One non-limiting and exemplary embodiment provides an image coding method and image decoding method which increase coding efficiency.

Solution to Problem

An image decoding method according to an aspect of the present disclosure is image decoding method for decoding a coded moving picture, the method including: switching a decoding order to either a fixed processing order or an adaptive processing order based on first information included in the coded moving picture; and decoding image data items included in the coded moving picture according to the decoding order switched to.

It is to be noted that the present disclosure can be realized or implemented not only as image coding methods and image decoding methods, but also apparatuses which include processing units for performing the processing steps included in the image coding methods and image decoding methods. In addition, the present disclosure may be realized as programs for causing computers to execute these steps. Furthermore, the present disclosure may be implemented as recording media such as computer-readable Compact Disc-Read Only Memories (CD-ROMs) including the programs recorded thereon, and information, data, and/or signals representing the programs. Naturally, the program, information, data, and signals may be distributed through communication networks such as the Internet.

Some or all of the structural elements which make up any one of the image coding apparatuses and the image decoding apparatuses may be configured in the form of a single system Large Scale Integration (LSI). Such a system LSI is a super multifunctional LSI manufactured by integrating plural structural element units on a single chip. For example, the system LSI is a computer system configured to include a macro processor, a ROM, a Random Access Memory (RAM), and the like.

These general and specific aspects of the image coding methods and image decoding methods according to the present disclosure may be implemented using a system, a method, an integrated circuit, a computer program, or a computer-readable recording medium such as a CD-ROM, or any combination of systems, methods, integrated circuits, computer programs, or computer-readable recording media.

Moreover, additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

Coding efficiency can be increased with the image coding method and image decoding method according to the present disclosure.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1 shows the syntax of a portion of the sequence header information in the bitstream.

FIG. 2A shows the processing order for each MaxCU.

FIG. 2B shows the processing order for each MaxCU of a difference size.

FIG. 3 shows the processing order of the CodingUnits (CU) within a MaxCU.

FIG. 4 is a flow chart showing the process flow for determining of the processing order of the image data items by the image decoding apparatus.

FIG. 6 shows an example of the structure of a portion of the bitstream according to Embodiment 1.

FIG. 7 is a flow chart showing the processing flow of the process for determining the decoding order of the image data items included in the bitstream, which is executed by the decoding order determination unit of the image decoding apparatus according to Embodiment 1.

FIG. 8 shows an example of the structure of a portion of the bitstream according to Variation 1 of Embodiment 1.

FIG. 9 is a flow chart showing the processing flow of the process for determining the decoding order of the image data items included in the bitstream, which is executed by the decoding order determination unit of the image decoding apparatus according to Variation 1 of Embodiment 1.

FIG. 10 shows an example of the structure of a portion of the bitstream according to Variation 2 of Embodiment 1.

FIG. 11 is a flow chart showing the processing flow of the process for determining the decoding order of the image data items included in the bitstream, which is executed by the decoding order determination unit of the image decoding apparatus according to Variation 2 of Embodiment 1.

FIG. 25 illustrates a structure of multiplexed data.

FIG. 28 shows a structure of TS packets and source packets in the multiplexed data.

FIG. 36 shows an example of a look-up table in which video data standards are associated with driving frequencies.

Figure 5:
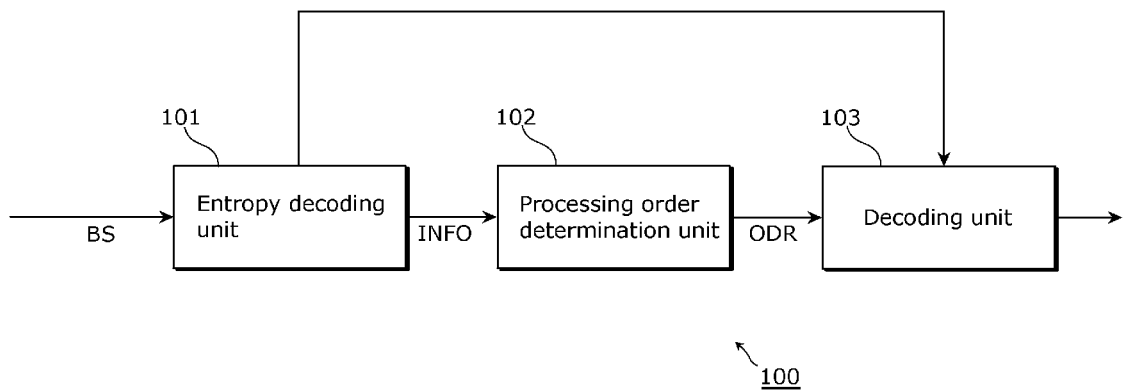
FIG. 5 is a block diagram showing an example of the structure of the image decoding apparatus according to Embodiment 1.

DESCRIPTION OF EMBODIMENTS (Underlying Knowledge Forming Basis of the Present Disclosure)

In relation to the HEVC system in Non Patent Literature 2 disclosed in the Background section, the inventors have found the problem indicated below.

In this method, the largest processing unit used (pixel unit) is determined by the following.

FIG. 1 shows the syntax of a portion of the sequence header information in the bitstream. "log 2_min_coding_block_size_minus3" indicates a value of the size of the smallest coding unit used in the bitstream, calculated by subtracting 3 from a binary logarithmic value (for example, the smallest size in the case of an 8 by 8 pixel area is 0). "log 2_diff_max_min_coding_block_size" indicates a binary logarithmic value of a value calculated by subtracting the size of the smallest coding unit used in the bitstream from the size of the largest coding unit used in the bitstream. In other words, the maximum processing unit, MaxCU, is calculated with Equation (Equation 1)

$$MaxCU = 2^{\wedge}(\log 2\_min\_coding\_block\_size\_minus3 + 3 + \log 2\_diff\_max\_min\_coding\_block\_size)$$ (it is to be noted that "$2^{\wedge}x$" denotes "2 to the power of $x$")

In the coding and decoding processes, the plurality of processing units, MaxCU, are processed in order from the processing unit on the left side of the screen to the processing unit on the right side. It is to be noted that when the MaxCU is further divided into units called CodingUnits, each CodingUnit within the MaxCU is processed in a z-pattern, zigzag order.

This will be explained with reference to FIG. 2A, FIG. 2B, and FIG. 3. These drawings illustrate the coding and decoding order.

FIG. 2A shows the processing order for each MaxCU. As FIG. 2A shows, in a MaxCU line on the screen, each MaxCU is processed in order from the left end of the MaxCU line to the right end. Then, after the rightmost MaxCU has been processed, each MaxCU in the next MaxCU line is processed in the same sequence as described above. It is to be noted that a MaxCU line is made up of a plurality of horizontally aligned MaxCUs on the screen.

FIG. 2B shows the processing order for each MaxCU of a difference size. The size of the MaxCU shown in FIG. 2B is half the size of the MaxCU shown in FIG. 2A (number of horizontal and vertical pixels). In this case as well, each MaxCU shown on the screen is processed in the sequence shown in FIG. 2A. However, when the sizes of the MaxCUs are different, the processing order for each image data item on the screen is different.

In other words, a plurality of image data items are included in the MaxCU. In the first MaxCU shown in FIG. 2A, every image data item included in that MaxCU is processed in the same order. However, since the size is small, the first MaxCU shown in FIG. 2B only includes a portion of the image data items (the upper right portion) included in the first MaxCU shown in FIG. 2A. Therefore, the rest of the image data items included in the first MaxCU shown in FIG. 2A are not processed first, but second and so on in the case of FIG. 2B.

In this way, the image data items on the screen are processed in an order according to the size of the MaxCU.

FIG. 3 shows the processing order of the CodingUnits (CU) within a MaxCU. As shown, each CU within the MaxCU is processed in a zigzag order similar to the writing order of the letter z.

FIG. 4 is a flow chart showing the processing flow of the process for determining the processing order of the image data items by the image decoding apparatus (processing order determination method).

The entropy decoding unit of the image decoding apparatus obtains from the bitstream and decodes "log 2_min_coding_block_size_minus3" (SW01). The entropy decoding unit sets the size of the MinCU, the smallest coding unit, to a value calculated by adding 3 to a value denoted as 2 to the power of "log 2_min_coding_block_size_minus3". Next, the entropy decoding unit obtains and decodes "log 2_diff_max_min_coding_block_size" (SW02). The entropy decoding unit sets the size of the MaxCU, the largest coding unit, to a value calculated by adding the MinCU size to a value denoted as 2 to the power of "log 2_diff_max_min_coding_block_size". The entropy decoding unit determines whether this MaxCU size is the same size as the initial decoding unit of the image decoding apparatus (SW03). It is to be noted that the initial decoding unit size is the initial value of the size of the processing unit used in the decoding (decoding unit), and is, for example, 16. Here, when the sizes are determined to be the same (yes in SW03), the entropy decoding unit ends the processing order determination process. In other words, the entropy decoding unit determines the processing order for the image data items to be an order in accordance with the initial decoding unit (=MaxCU). On the other hand, when the entropy decoding unit determines that the sizes are different (no in SW03), the MaxCU is set as the decoding unit (SW04). In other words, the entropy decoding unit determines the processing order for the image data items to be an order in accordance with the decoding unit (=MaxCU).

Here, with the conventional techniques described above, cases in which the MaxCU size and the initial decoding unit size are different are frequent.

Moreover, when the image decoding apparatus is configured from implemented hardware, for example, hardware circuitry is often specifically provided for changing the decoding order of the image data items. Particularly with recent moving picture coding methods (Non Patent Literature 1 and 2), processing is extremely complicated, necessitating the implementation of fixed circuits for accomplishing real-time processing. As a result, there is a problem in that the number of circuits in the image decoding apparatus is increased.

Moreover, in order to change the decoding order, it is necessary to always include information for identifying the processing unit in the bitstream, thereby causing the problem of a decrease in coding efficiency.

In order to solve the aforementioned problems, an image decoding method according to an aspect of the present disclosure is image decoding method for decoding a coded moving picture, the method including: switching a decoding order to either a fixed processing order or an adaptive processing order based on first information included in the coded moving picture; and decoding image data items included in the coded moving picture according to the decoding order switched to.

With this, processing in which it is premised that the processing order is adaptive is not constantly required to be performed since the decoding order is switched to either a fixed or adaptive processing order based on first information, which is a flag, for example, thereby making it possible to limit the amount of circuits. Furthermore, even an image decoding apparatus incapable of making the processing order adaptive can determine, based on the first information, whether it is possible to decode the coded moving picture, and adequately decode when possible. That is to say, image decoding apparatuses incapable of varying the processing order and image decoding apparatuses capable of varying the processing order can maintain exchangeability, interchangeability, or compatibility with respect to decoding coded moving pictures. As a result, image decoding apparatuses incapable of varying the processing order can be made compatible and the amount of circuits can be limited. Moreover, when the processing order is fixed, including information for identifying the processing unit defining the processing order in the bitstream, which is the coded moving picture, is not required. As such, coding efficiency can be increased.

Moreover, in the decoding, when the decoding order is switched to the fixed processing order in the switching, the image data items included in the coded moving picture may be decoded according to a processing order defined by a predetermined processing unit, without using second information for identifying a largest decoding unit.

With this, when the processing order is fixed, including the second information in the bitstream, which is the coded moving picture, is not necessary since the second information (second parameter) for identifying the largest decoding unit is not used. As a result, coding efficiency can be increased.

Moreover, in the decoding, when the decoding order is switched to the fixed processing order in the switching, the image data items included in the coded moving picture may be decoded according to a processing order defined by a predetermined processing unit, without using the second information or third information for identifying a smallest decoding unit With this, when the processing order is fixed, including the third information in the bitstream, which is the coded moving picture, is not necessary since the third information (first parameter) for identifying the smallest decoding unit is not used. As a result, coding efficiency can be increased.

Moreover, the first information may be information that indicates a profile of the coded moving picture to prompt switching between at least two or more parameters, and, in the switching, the at least two or more parameters may be switched between in addition to the decoding order.

With this, coding efficiency can be further increased since the coding order switching and the switching between the two or more parameters are adequately controlled by the first information indicating a profile.

Moreover, the first information may be size information that defines a decoding order, and, in the decoding, the image data items included in the coded moving picture may be decoded according to a processing order unrestricted by a largest decoding unit and defined by the size information.

With this, since the image data items are decoded according to a processing order that is not restricted to the largest decoding unit, that is, to the largest coding unit, the processing order can be aptly suited to the configuration of the image decoding apparatus and, irrespective of the processing order, the largest coding unit can be made smaller and coding efficiency increased.

In order to solve the aforementioned problems, an image coding method according to an aspect of the present disclosure is an image coding method for coding a moving picture to generate a coded moving picture, the method including: switching a coding order to either a fixed processing order or an adaptive processing order; coding image data items included in the moving picture according to the coding order switched to; and outputting the coded moving picture after including therein the coded image data items and first information for identifying whether the coding order is switched to the fixed processing order or the adaptive processing order.

With this, the coding order is switched to either fixed or adaptive, and first information for identifying whether the coding order switched to is fixed or adaptive is included in the bitstream, which is the coded moving picture. As a result, even an image decoding apparatus incapable of making the processing order adaptive can determine, based on the first information, whether it is possible to decode the coded moving picture, and adequately decode when possible. That is to say, image decoding apparatuses incapable of varying the processing order and image decoding apparatuses capable of varying the processing order can maintain exchangeability, interchangeability, or compatibility with respect to decoding coded moving pictures. As a result, image decoding apparatuses incapable of varying the processing order can be made compatible and the amount of circuits can be limited. Moreover, when the processing order is fixed, including information for identifying the processing unit defining the processing order in the bitstream, which is the coded moving picture, is not required. As such, coding efficiency can be increased.

Moreover, in the outputting, when the coding order is switched to the fixed processing order in the switching, second information for identifying a largest coding unit may be prohibited from being included in the coded moving picture.

With this, when the processing order is fixed, coding efficiency is increased since the second information (second parameter) for identifying the largest coding unit is not included in the bitstream, which is the coded moving picture.

Moreover, in the outputting, when the coding order is switched to the fixed processing order in the switching, in addition to the second information, third information for identifying a smallest coding unit may be prohibited from being included in the coded moving picture.

With this, when the processing order is fixed, coding efficiency is further increased since the third information (first parameter) for identifying the smallest coding unit is not included in the bitstream, which is the coded moving picture.

Moreover, in the outputting, information that indicates a profile of the coded moving picture to prompt switching between at least two or more parameters may be outputted as the first information.

With this, coding efficiency can be further increased since the image decoding apparatus adequately controls the decoding order switching and the switching between the two or more parameters with the first information indicating the profile. As a result, coding efficiency can be further increased.

Moreover, the first information may be size information that defines a coding order, and, in the coding, the image data items included in the coded moving picture may be coded according to a processing order unrestricted by a largest coding unit and defined by the size information.

With this, since the image data items are coded according to a coding order that is not restricted to the largest coding unit, the processing order can be aptly suited to the configuration of the image decoding apparatus and, irrespective of the processing order, the largest coding unit can be made smaller and coding efficiency increased.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are specifically described with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following embodiments, structural elements not recited in any one of the independent claims are described as arbitrary structural elements.

Embodiment 1

The image decoding apparatus according to Embodiment 1 fixes the decoding order of each image data item according to a flag included in the bitstream, which is the coded moving picture, and decodes the bitstream in the fixed processing order. In other words, according to this embodiment, the image coding unit uses a flag to convey, to a circuit provided in the image decoding apparatus, the fixing of the decoding order, and the image decoding apparatus decodes the bitstream coded with increased efficiency as a result of the flag.

FIG. 5 is a block diagram showing an example of the structure of an image decoding apparatus 100 according to this embodiment. The image decoding apparatus 100 includes an entropy decoding unit 101, a processing order determination unit 102, and a decoding unit 103. The entropy decoding unit 101 entropy decodes the bitstream (BS), outputs, to the processing order determination unit 102, information (INFO) relating to decoding order generated as a result of the entropy decoding, along with outputting, to the decoding unit 103, the entropy decoded bitstream (BS). The processing order determination unit 102 determines the decoding order based on the information (INFO), and outputs the determined processing order (ODR) to the decoding unit 103. The decoding unit 103 performs decoding processing based on the processing order (ODR) on the entropy decoded bitstream (BS). In other words, the decoding unit 103 decompresses the compressed moving picture as shown by the bitstream (BS).

It is to be noted that the group of structural elements in the image decoding apparatus 100 including the entropy decoding unit 101 and the processing order determination unit 102 is denoted as the decoding order determination unit.

FIG. 6 shows an example of the structure (syntax) of a portion of the bitstream (BS) according to this embodiment. Here, descriptors indicate methods of entropy decoding for parameters in the bitstream (BS). For example, ue(v) indicates that a parameter is Exp-Golomb-coded, u(N) indicates that a parameter is N-bit information. Further details are as described in Non Patent Literature 1 and 2.

This embodiment is characterized by the inserting, in the bitstream (BS), of a flag (parameter) denoted as "flexible_coding_order_enabled_flag" showing whether the coding (decoding) order is to be fixed or not. In other words, this embodiment is characterized by the insertion of the above-described flag in the bitstream (BS) by the image coding unit before determination of the smallest coding unit MinCU and the largest coding unit MaxCU. Furthermore, when this flag indicates that the processing order is not to be fixed (that the processing order is adaptive), "log 2_min_coding_block_size_minus3" and "log 2_diff_max_min_coding_block_size" are placed after the flag. It is to be noted that hereinafter "log 2_min_coding_block_size_minus3" is also referred to as "first parameter", and "log 2_diff_max_min_coding_block_size" is also referred to as "second parameter".

FIG. 7 is a flow chart showing the processing flow of the process for determining the decoding order of the image data items included in the above-mentioned bitstream (BS) (processing order determination method) executed by the decoding order determination unit of the image decoding apparatus 100 according to this embodiment.

The entropy decoding unit 101 obtains the bitstream (BS) having the above-described structure, and firstly entropy decodes the flag "flexible_coding_order_enabled_flag" (S301). Here, the processing order determination unit 102 receives the entropy decoded "flexible_coding_order_enabled_flag" as a portion of the information (INFO), and determines whether the flag is 1 or not (S302). Here, when it is determined that the flag is not 1 (when it is, for example, 0) (no in S302), the processing order determination unit 102 sets the decoding unit to the initial decoding unit (S303). In other words, the processing order determination unit 102 determines the decoding order for the image data items to be the order defined by a predetermined processing unit (the initial decoding unit).

On the other hand, when it is determined that the "flexible_coding_order_enabled_flag" is 1 (yes in S302), the entropy decoding unit 101 next obtains the first parameter "log 2_min_coding_block_size_minus3" from the bitstream (BS) and entropy decodes the obtained first parameter (S304). The processing order determination unit 102 obtains the entropy decoded first parameter as a portion of the information (INFO). The processing order determination unit 102 then sets the size of the smallest coding unit MinCU to a value calculated by adding 3 to a value denoted as 2 to the power of "log 2_min_coding_block_size_minus3".

Next, the entropy decoding unit 101 obtains the second parameter "log 2_diff_max_min_coding_block_size" from the bitstream (BS) and entropy decodes the obtained second parameter (S305). The processing order determination unit 102 obtains the entropy decoded second parameter as a portion of the information (INFO). The processing order determination unit 102 sets the size of the largest coding unit MaxCU to a value calculated by adding the MinCU to a value denoted as 2 to the power of "log 2_diff_max_min_coding_block_size". The processing order determination unit 102 then sets the decoding unit to MaxCU (S306). In other words, the processing order determination unit 102 determines the decoding order of the image data items to be a decoding order defined by the MaxCU.

It is to be noted that in this embodiment, in step S306, the decoding order is determined to be an order defined by the MaxCU, but in place of step S306, steps SW03 through SW04 shown in FIG. 4 may be performed.

For example, when the image decoding apparatus 100 is configured as a hardware circuit and the decoding order is to be varied, these steps SW03 through SW04 shown in FIG. 4 are performed. In other words, the processing order determination unit 102 of the image decoding apparatus 100 determines whether the MaxCU size is the same size as the initial decoding unit of the image decoding apparatus 100 (SW03). Here, when the sizes are determined to be the same (yes in SW03), the processing order determination unit 102 ends the processing order determination process. On the other hand, when the processing order determination unit 102 determines that the sizes are different (no in SW03), the MaxCU is set as the decoding unit.

In this way, in this embodiment, the image coding apparatus sets the "flexible_coding_order_enabled_flag" to be 0 for image decoding apparatuses that do not support an adaptive decoding order. As a result, the image decoding apparatus 100 according to this embodiment can fix the decoding order and the size of the smallest decoding unit MinCU to a predetermined order and size and decode the bitstream (BS). Moreover, when the above-described flag is 0, it is possible to reduce the bitstream (BS) coding load and increase coding efficiency since it is not necessary to code and decode the "log 2_min_coding_block_size_minus3" and the "log 2_diff_max_min_coding_block_size".

In other words, the image decoding method according to this embodiment is a method for decoding a coded moving picture, the method including: switching a decoding order to either a fixed processing order or an adaptive processing order based on first information included in the coded moving picture; and decoding image data items included in the coded moving picture according to the decoding order switched to. It is to be noted that the above-described switching is performed by the processing order determination unit 102, and the decoding of the above-described image data items is performed by the decoding unit 103. With this, it is possible to increase coding efficiency and limit the number of circuits. Moreover, the image decoding apparatus 100 and the image decoding method according to this embodiment perform entropy decoding, but the above-described advantages can be achieved even without performing entropy decoding.

(Variation 1)

It is to be noted that Embodiment 1 can be configured as follows.

FIG. 8 shows an example of the structure (syntax) of a portion of the bitstream (BS) according to Variation 1 of Embodiment 1.

In this variation, the flag "flexible_coding_order_enabled_flag" indicating whether the coding (decoding) order is to be fixed is inserted in the bitstream (BS) before "log 2_min_coding_block_size_minus3". Furthermore, this variation is characterized by the insertion of "log 2_min_coding_block_size_minus3" after "log 2_diff_max_min_coding_block_size" according to a value indicated by the above-described flag. In other words, in this variation, the image coding apparatus is characterized by the insertion of the above-described flag in the bitstream (BS) before determining the smallest coding unit MinCU and the largest coding unit MaxCU, and by making the smallest coding unit MinCU adaptive regardless of the flag.

FIG. 9 is a flow chart showing the processing flow of the process for determining the decoding order of the image data items included in the above-mentioned bitstream (BS) (processing order determination method) executed by the decoding order determination unit of the image decoding apparatus 100 according to this variation.

The entropy decoding unit 101 obtains the bitstream (BS) having the above-described structure, and firstly entropy decodes the flag "flexible_coding_order_enabled_flag" (S501). Here, the processing order determination unit 102 receives the entropy decoded "flexible_coding_order_enabled_flag" as a portion of the information (INFO), and determines whether the flag is 1 or not (S502). Here, when it is determined that the flag is not 1 (when it is, for example, 0) (no in S502), the processing order determination unit 102 sets the decoding unit to the initial decoding unit (S503). In other words, the processing order determination unit 102 determines the decoding order of the image data items to be the order defined by a predetermined processing unit (the initial decoding unit).

Next, the entropy decoding unit 101 obtains the first parameter "log 2_min_coding_block_size_minus3" from the bitstream (BS) and entropy decodes the obtained first parameter (S504). The processing order determination unit 102 obtains the entropy decoded first parameter as a portion of the information (INFO). The processing order determination unit 102 then sets the size of the smallest coding unit MinCU to a value calculated by adding to a value denoted as 2 to the power of "log 2_min_coding_block_size_minus3".

On the other hand, when the "flexible_coding_order_enabled_flag" is determined to be 1 (yes in S502), the entropy decoding unit 101 obtains the first parameter "log 2_min_coding_block_size_minus3" from the bitstream (BS) and entropy decodes this first parameter (S505). The processing order determination unit 102 obtains the entropy decoded first parameter as a portion of the information (INFO). The processing order determination unit 102 then sets the size of the smallest coding unit MinCU to a value calculated by adding 3 to a value denoted as 2 to the power of "log 2_min_coding_block_size_minus3". It is to be noted that since the processing in step S505 is the same as that of step S504, the same single circuit may execute these steps. Next, the entropy decoding unit 101 obtains the second parameter "log 2_diff_max_min_coding_block_size" from the bitstream (BS) and entropy decodes the obtained second parameter (S506). The processing order determination unit 102 obtains the entropy decoded second parameter as a portion of the information (INFO). The processing order determination unit 102 then sets the size of the largest coding unit MaxCU to a value calculated by adding the MinCU to a value denoted as 2 to the power of "log 2_diff_max_min_coding_block_size". The processing order determination unit 102 then sets the decoding unit to MaxCU (S507). In other words, the processing order determination unit 102 determines the decoding order of the image data items to be a decoding order defined by the MaxCU.

It is to be noted that in this variation, in step S507, the decoding order is determined to be an order defined by the MaxCU, but in place of step S507, steps SW03 through SW04 shown in FIG. 4 may be performed.

For example, when the image decoding apparatus 100 is configured as a hardware circuit and the decoding order is to be varied, these steps SW03 through SW04 shown in FIG. 4 are performed. In other words, the processing order determination unit 102 of the image decoding apparatus 100 determines whether the MaxCU size is the same size as the initial decoding unit of the image decoding apparatus 100 (SW03). Here, when the sizes are determined to be the same (yes in SW03), the processing order determination unit 102 ends the processing order determination process. On the other hand, when the processing order determination unit 102 determines that the sizes are different (no in SW03), the MaxCU size is set as the decoding unit.

In this way, in this variation, the image coding apparatus sets the "flexible_coding_order_enabled_flag" to be 0 for image decoding apparatuses that do not support an adaptive decoding order. As a result, the image decoding apparatus 100 according to this variation can fix the decoding order to a predetermined order and decode the bitstream (BS). Moreover, when the above-described flag is 0, it is possible to reduce the bitstream coding load and increase coding efficiency since coding and decoding of "log 2_diff_max_min_coding_block_size" is not necessary.

Furthermore, regardless of whether the above-described flag is 0 or 1, the MinCU size can be varied since "log 2_min_coding_block_size_minus3" is placed in the bitstream (BS). As such, even if the decoding order is fixed, the size of the smallest decoding (coding) processing unit MinCU can be changed. Consequently, when, for example, information related to an image is not required to be held in each of a plurality of small regions, that is to say, when the resolution of an input image is above a certain threshold (for example 1920×1080 pixels), it is possible to increase coding efficiency by setting the MinCU size to a large value.

In this way, with Variation 1, in the decoding, when the decoding order is switched to the fixed processing order in the switching, the image data items included in the coded moving picture are decoded according to a processing order defined by a predetermined processing unit, without using second information (second parameter) for identifying a largest decoding unit. As a result, coding efficiency can be increased.

It is to be noted that with Embodiment 1, in the decoding, when the decoding order is switched to the fixed processing order in the switching, the image data items included in the coded moving picture are decoded according to a processing order defined by a predetermined processing unit, without using the second information (second parameter) or third information (first parameter) for identifying a smallest decoding unit. As a result, coding efficiency can be further increased.

(Variation 2)

It is to be noted that Embodiment 1 can be configured as follows.

FIG. 10 shows an example of the structure (syntax) of a portion of the bitstream (BS) according to Variation 2 of Embodiment 1.

In this variation, the meaning of "flexible_coding_order_enabled_flag" in Embodiment 1 is embedded in information called "profile_idc" for determining a profile indicating conditions for the image decoding apparatus to which a bitstream corresponds. In other words, this variation is characterized by the use of a third parameter called "profile_idc" having the function of the "flexible_coding_order_enabled_flag", in place of said flag. When the image coding apparatus determines that the first and second parameters are required, a third parameter is inserted in the bitstream before the first and second parameters.

The image decoding apparatus 100, after entropy decoding the third parameter, performs the decoding unit setting processes shown in steps S302 through S306 in FIG. 7 of Embodiment 1, or the decoding unit setting processes shown in steps S502 through S507 in FIG. 9 of Variation 1 of Embodiment 1, based on the third parameter.

FIG. 11 is a flow chart showing the processing flow of the process for determining the decoding order of the image data items included in the above-mentioned bitstream (BS) (processing order determination method) executed by the decoding order determination unit of the image decoding apparatus 100 according to this variation.

The entropy decoding unit 101 obtains the bitstream (BS) having the above-described structure, and decodes the third parameter "profile_idc" (S701). Here, when the "profile_idc" indicates a profile that uses a hardware circuit structure that is a compact structure (for example, a profile called a baseline or main profile), the processing order determination unit 102 performs the same processing as performed when the "flexible_coding_order_enabled_flag" is 0. On the other hand, when the "profile_idc" indicates a profile that assumes a professional device or a device capable of high level operation (for example, a profile called a high or professional profile), the same processing is performed as when the "flexible_coding_order_enabled_flag" is 1. The setting process of the decoding unit is performed with this kind of processing by the processing order determination unit 102 (S702).

In this way, with this variation, since the third parameter "profile_idc" is used in place of the "flexible_coding_order_enabled_flag" flag, separate coding is not required for said flag. As a result, coding load can be reduced and coding efficiency can be increased.

Moreover, with image decoding apparatuses that do not support an adaptive decoding order, it is assumed that placing restrictions on other parameters in the same manner is required. For example, there are instances where it is necessary to prohibit the use of coding tools with large processing loads or restrict a parameter, for example. In this variation, it is possible with the third parameter to uniquely notify the image decoding unit not only of the decoding order, but of these restrictions as well.

It is to be noted that in order to notify the image decoding apparatus more explicitly, an operation using the third parameter and an operation using the flag "profile_idc and flexible_coding_order_enabled_flag" may be coupled.

In this way, with Variation 2, the first information is information that indicates a profile of the coded moving picture to prompt switching between at least two or more parameters, and in the switching of the decoding order, the at least two or more parameters are switched between in addition to the decoding order. As a result, coding efficiency can be further increased since flags are not used.

(Variation 3)

It is to be noted that Embodiment 1 can be configured as follows.

Figure 12:
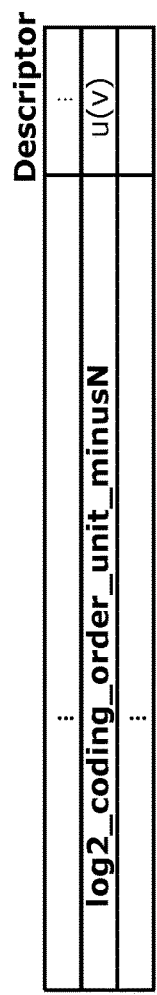
FIG. 12 shows an example of the structure of a portion of the bitstream according to Variation 3 of Embodiment 1.

FIG. 12 shows an example of the structure (syntax) of a portion of the bitstream (BS) according to Variation 3 of Embodiment 1.

This variation is characterized by the inclusion in the bitstream of a fourth parameter indicating a decoding unit for uniquely and more explicitly identifying the decoding order, not a flag for differentiating between the use or non-use of a predetermined decoding order. The fourth parameter is "log 2_coding_order_unit_minusN".

Figure 13:
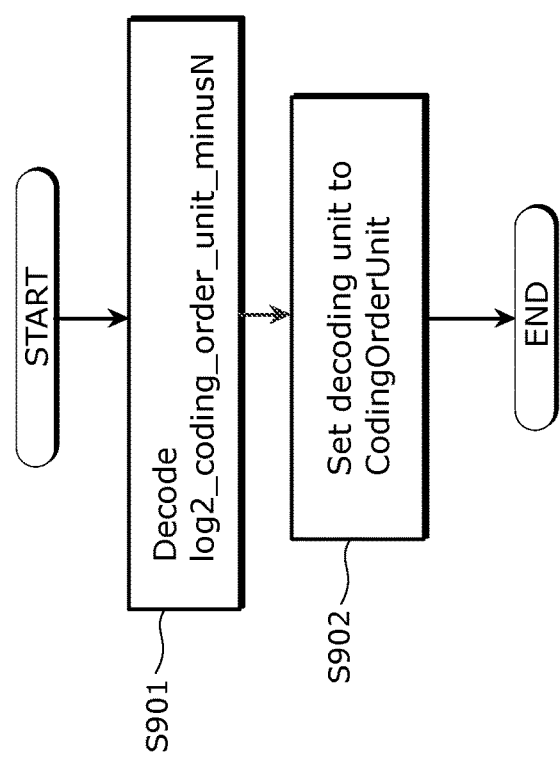
FIG. 13 is a flow chart showing the processing flow of the process for determining the decoding order of the image data items included in the bitstream, which is executed by the decoding order determination unit of the image decoding apparatus according to Variation 3 of Embodiment 1.

FIG. 13 is a flow chart showing the processing flow of the process for determining the decoding order of the image data items included in the above-mentioned bitstream (BS) (processing order determination method) executed by the decoding order determination unit of the image decoding apparatus 100 according to this variation.

The entropy decoding unit 101 obtains the bitstream (BS) having the above-described structure, and entropy decodes the fourth parameter "log 2_coding_order_unit_minusN" (S901). The processing order determination unit 102 obtains the entropy decoded fourth parameter as a portion of the information (INFO). The processing order determination unit 102 then sets a value denoted as 2 to the power of ("log 2_coding_order_unit_minusN"+N) to the size of the decoding unit "CodingOrderUnit" (S902).

With this, in this variation, it is possible to transmit an explicit decoding order. It is to be noted that by placing the fourth parameter "log 2_coding_order_unit_minusN" after the first parameter "log 2_min_coding_block_size_minus3", it is possible to make the value N a value obtained by adding 3 to log 2_min_coding_block_size_minus3. This is because it is not possible to determine the decoding order using a unit smaller than the MinCU. With this configuration, it is possible to further reduce the coding load.

It is to be noted that explicitly transmitting the decoding unit "CodingOrderUnit" in this manner makes it possible to further increase the coding efficiency.

Figure 14:
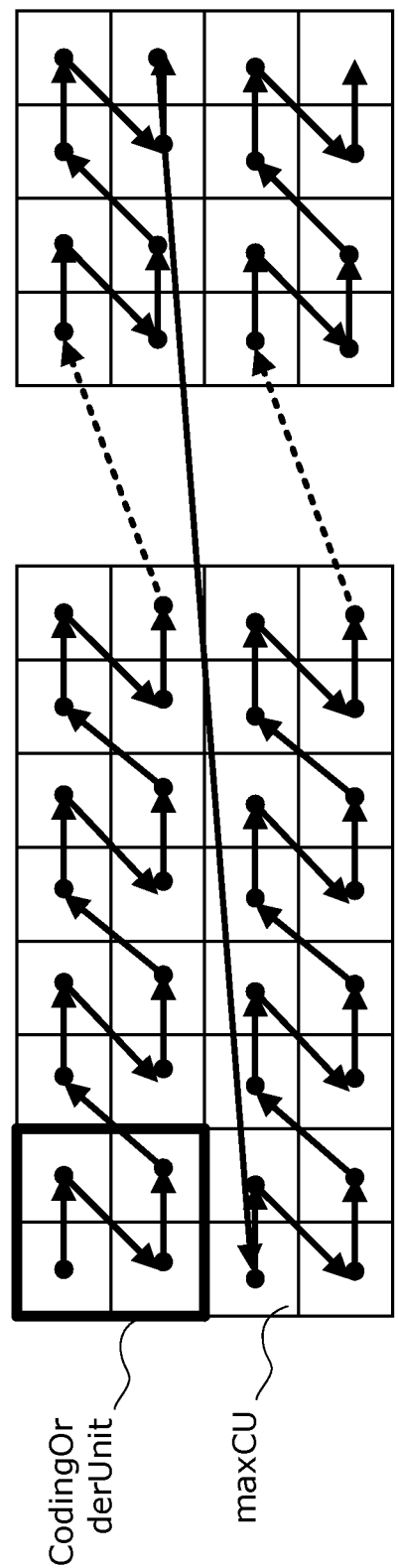
FIG. 14 shows an example of the processing order according to Variation 3 of Embodiment 1.

FIG. 14 is an example of a processing order in which the "CodingOrderUnit" size is 64, for example, and the MaxCU size is 32. With conventional methods, as FIG. 2A and FIG. 2B show, the decoding order is determined by the MaxCU unit. For this reason, when the MaxCU is small (FIG. 2B), the decoding order is such that raster scanning is performed in small increments. In contrast, with this variation, as FIG. 14 shows, even when the MaxCU is small, it is possible to decode the image data items according to the decoding order defined by a big unit.

In this way, coding efficiency is increased with this variation since a small MaxCU can be used. Moreover, it is generally necessary to increase the circuit size in order to decode in big units, but with this variation, since a small MaxCU can be used, it is possible to keep the circuit size small.

Furthermore, with this variation, the blocks in the area of the block to be processed are often already processed. The latest moving picture coding methods (for example, Non Patent Literature 1 and 2) increase coding efficiency by referring to surrounding encoded or decoded information. In the processing order shown in FIG. 14, cases in which the blocks in the area of the block to be processed (for example, the block above and the block to the left) are previously processed are great in comparison to the processing order shown in FIG. 2B. As a result, coding efficiency can be further increased.

It is to be noted that in the case of this variation, the first parameter "log 2_min_coding_block_size_minus3" and the second parameter "log 2_diff_max_min_coding_block_size" may be included in the bitstream (BS) in the same positions as in the conventional art and may be included in the bitstream (BS) in the same positions as Embodiment 1.

In this way, with this variation, the first information is information that defines a decoding order, and in the decoding, the image data items included in the coded moving picture are decoded according to a processing order unrestricted by a largest decoding unit and defined by the size information. With this, it is possible for the image coding apparatus and the image decoding apparatus to voluntarily use an adaptive processing order as well as use mutually use an adaptive processing order. As a result, coding efficiency can be further increased. With this, since the image data items are decoded according to a processing order that is not restricted to the largest decoding unit, that is, to the largest coding unit, the processing order can be aptly suited to the configuration of the image decoding apparatus and, irrespective of the processing order, the largest coding unit can be made smaller and coding efficiency increased.

(Variation 4)

It is to be noted that the image decoding apparatus 100 according to Embodiment 1 may be realized having a configuration different than the configuration shown in FIG. 5.

Figure 15:
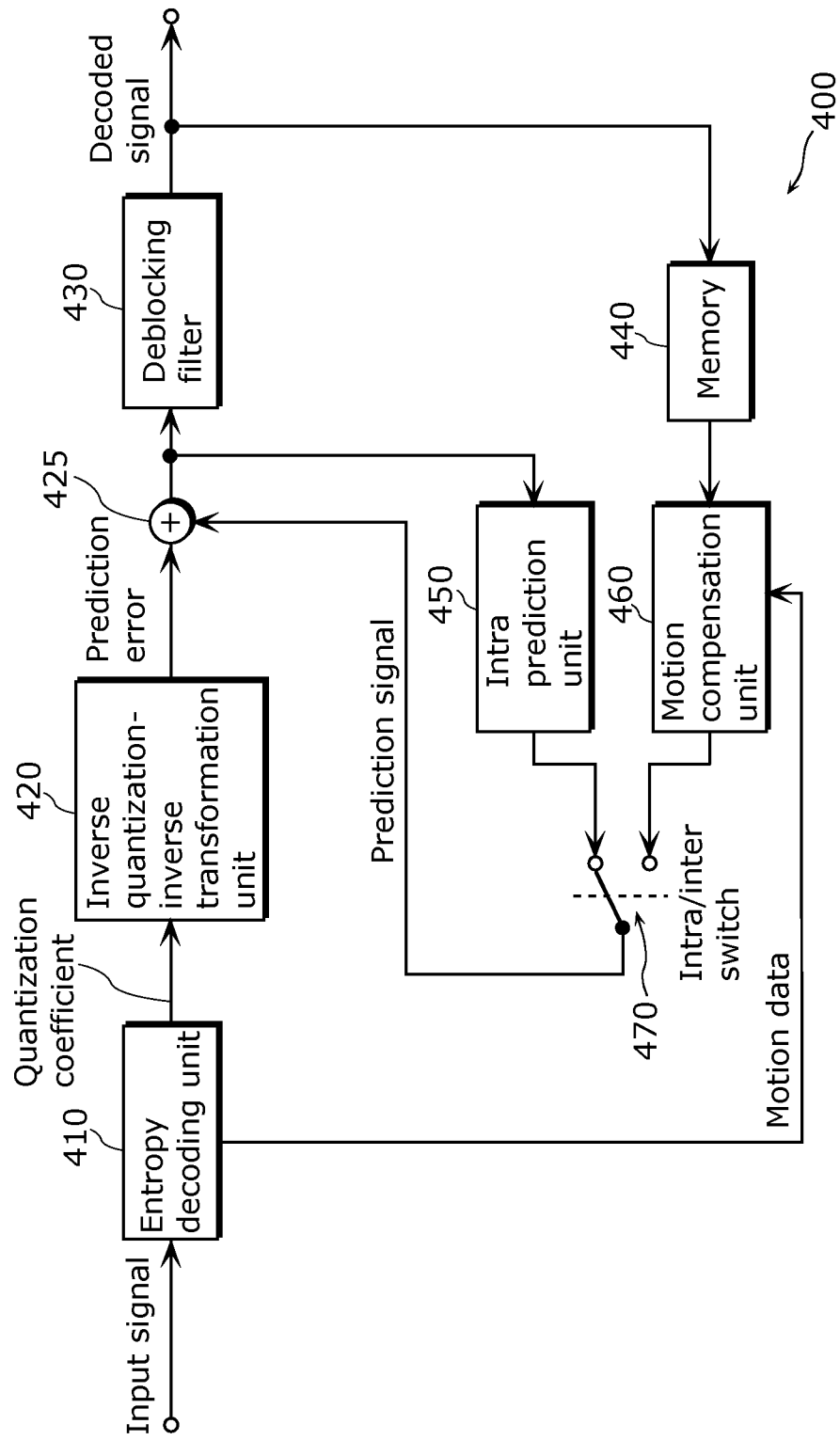
FIG. 15 is a block diagram showing an example of the structure of the image decoding apparatus according to the Variation 4 of Embodiment 1.

FIG. 15 is a block diagram showing an example of the structure of an image decoding apparatus 400 according to this variation.

As FIG. 15 shows, the image decoding apparatus 400 includes an entropy decoding unit 410, an inverse quantization-inverse transformation unit 420, an accumulator 425, a deblocking filter 430, a memory 440, an intra prediction unit 450, a motion compensation unit 460, and a intra/inter switch 470.

Here, the entropy decoding unit 410 has the functions of the entropy decoding unit 101 and the processing order determination unit 102 according to Embodiment 1 and Variations 1 through 3. Moreover, among the structural elements included in the image decoding apparatus 400, the group of structural elements which include all of the structural elements excluding the entropy decoding unit 410 corresponds to the decoding unit 103 according to Embodiment 1 and Variations 1 through 3.

The image decoding apparatus 400 having this configuration obtains a bitstream which is a compression coded moving picture, as an input signal, and decodes that input signal, similar to the image decoding apparatus 100. For example, the input signal is processed on a block-by-block basis as a decoding target signal by the image decoding apparatus 400. In other words, the image decoding apparatus 400 performs variable length decoding (entropy decoding), inverse quantization, and inverse transformation and such on the decoding target signal.

The entropy decoding unit 410 reconstructs quantized coefficients and motion data from an input signal by variable length decoding said input signal. The entropy decoding unit 410 then outputs the quantized coefficients to the inverse quantization-inverse transformation unit 420, and outputs the motion data to the motion compensation unit 460.

The inverse quantization-inverse transformation unit 420 reconstructs transform coefficients by inverse quantizing the quantized coefficients reconstructed by the entropy decoding unit 410. The inverse quantization-inverse transformation unit 420 then reconstructs a prediction error by inverse transforming the reconstructed transform coefficients (for example, inverse frequency transform).

The accumulator 425 generates a decoded image by summing the reconstructed prediction error and the prediction signal.

The deblocking filter 430 applies a deblocking filter to the generated decoded image. The decoded image with the deblocking filter applied is output as a decoded signal.

The memory 440 is for storing reference images used in motion compensation. Specifically, the memory 440 stores, as references images, decoded images to which a deblocking filter has been applied.

The intra prediction unit 450 generates a prediction signal (intra prediction signal) by performing intra prediction on the decoding target signal. Specifically, the intra prediction unit 450, from among decoded images generated by the accumulator 425, refers to images around the decoding target signal (decoding target block) and generates an intra prediction signal by performing intra prediction on the decoding target signal.

The motion compensation unit 460 generates a prediction signal (inter prediction signal) by performing motion compensation on the decoding target signal based on the motion data outputted from the entropy decoding unit 410.

The intra/inter switch 470 selects either the intra prediction signal or the inter prediction signal, and outputs to the accumulator 425 the selected signal as the prediction signal.

As a result of above configuration, the image decoding apparatus 400 decodes a compression coded moving picture.

The image decoding apparatus and the image decoding method according to Embodiment 1 and the variations thereof, determines, based on information included in the bitstream, such as flags, whether the decoding order is to be made to be adaptive according to the configuration of the bitstream or made to be a predetermined order, and decodes the image data items according to the order resulting from the determining. In other words, the image decoding apparatus can switch between decoding according to an adaptive processing order and decoding according to a fixed processing order. Moreover, an image decoding apparatus not capable of varying the decoding order can determine, based on information such as the above-described flag, whether the bitstream is a bitstream that can be accommodated by the configuration of said image decoding apparatus, and when it is determined that the bitstream is compatible, can correctly decode that bitstream. As a result, information for varying the processing order can be omitted from bitstreams for image decoding apparatuses not capable of varying the decoding order. As a result, coding efficiency can be increased. Furthermore, the number of circuits in the image decoding apparatus can be reduced since it is not necessary to configure the image decoding apparatus to accommodate the adaptive processing order.

Moreover, an efficiently coded signal such as this can be properly decoded with the image decoding apparatus and image decoding method according to Embodiment 1 and its variations. Moreover, with this configuration, processing time can be estimated easily. For example, the image decoding apparatus according to Embodiment 1 and its variations can be realized as a high speed arithmetic circuit necessary for real time playback of high resolution video and the like.

Embodiment 2

The image coding apparatus according to Embodiment 1 codes and transmits the coding order. In other words, the image coding apparatus according to this embodiment generates and outputs an efficiently coded bitstream while transmitting the decoding order, that is to say, the coding order relative to the circuits included in the image decoding apparatus.

Figure 16:
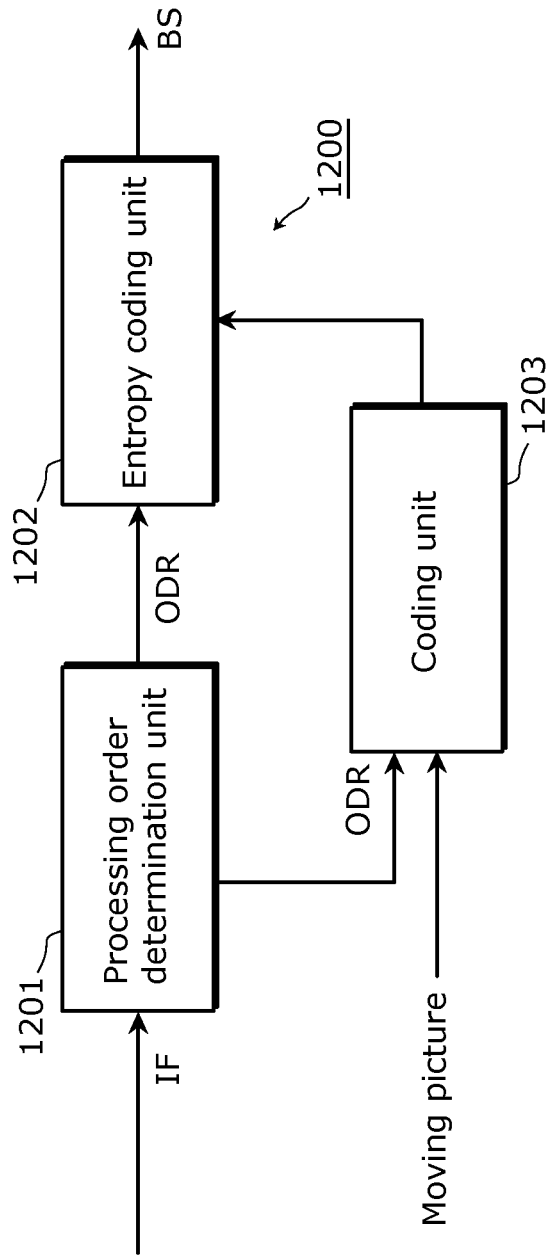
FIG. 16 is a block diagram showing an example of the structure of the image coding apparatus according to Embodiment 2.

FIG. 16 is a block diagram showing an example of the structure of an image coding apparatus 1200 according to this embodiment. The image coding apparatus 1200 includes a processing order determination unit 1201, an entropy coding unit 1202, and a coding unit 1203. It is to be noted that the group of structural elements including the processing order determination unit 1201 and the entropy coding unit 1202 is denoted as the coding order transmission unit.

Figure 17:
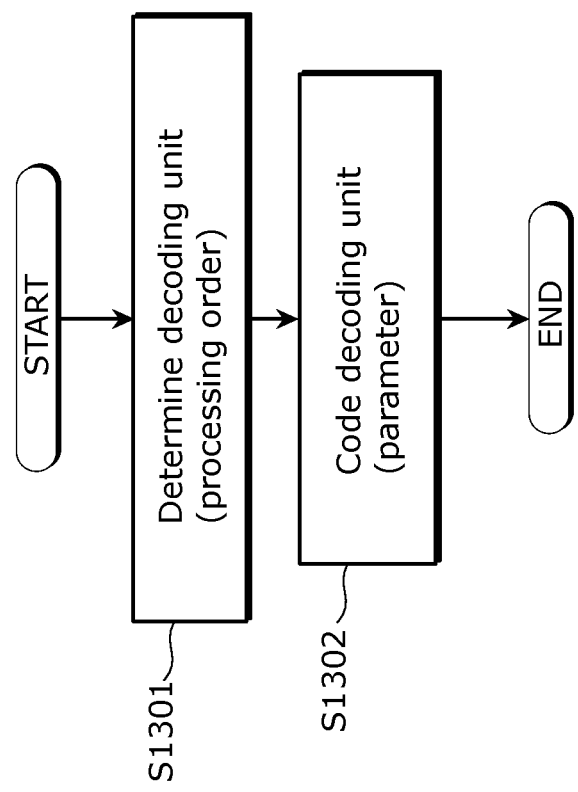
FIG. 17 is a flow chart showing the process flow for an operation of the coding order transmission unit of the image coding apparatus according to Embodiment 2.

FIG. 17 is a flow chart showing the process flow for an operation of the coding order transmission unit of the image coding apparatus 1200 according to this embodiment.

The processing order determination unit 1201 determines the coding order taking into consideration the image decoding apparatus or increase in coding efficiency in the image coding apparatus 1200 (S1301). In other words, the processing order determination unit 1201 obtains information (IF) on the configuration of the image decoding apparatus and coding efficiency, determines the coding order based on the obtained information (IF), and outputs the processing order (ODR). Here, the coding order is similar to the decoding order, and uniquely indicates a coding or decoding unit (decoding unit). In other words, determining the coding order means thereby determining the decoding unit.

Next, the entropy coding unit 1202, based on the processing order (ODR), configures and entropy codes at least one parameter according to a predetermined method, and includes the entropy encoded at least one parameter in the bitstream (BS) (S1302). This kind of bitstream (BS) is output from the entropy coding unit 1202. Here, "at least one parameter" is at least one of the first through fourth parameters or flags according to the above-described Embodiment 1 and its variations, and indicates a coding unit, that is to say, a decoding unit. Moreover, this at least one parameter is input into the bitstream (BS) in accordance with the syntax like that shown in FIG. 6, FIG. 8, FIG. 10, and FIG. 12. It is to be noted that which syntax the bitstream (BS) is configured in accordance with from among the syntaxes shown in FIG. 6, FIG. 8, FIG. 10, and FIG. 12 is determined depending on whether or not the coding order matches the initial value of the decoding order in the image decoding apparatus (initial decoding unit) or determined in compliance with the largest size of the coding.

The coding unit 1203 obtains the moving picture and the processing order (ODR), and performs coding processing according to the processing order (ODR) on the image data items included in the obtained moving picture. In other words, the coding unit 1203 compresses the image data of the moving picture by, for example, calculating the difference between the moving picture and the prediction picture.

The moving picture compressed in this manner is output to the entropy coding unit 1202, and included into the bitstream (BS) along with the above-described parameter.

In this way, the image coding method according to this embodiment is an image coding method for coding a moving picture to generate a coded moving picture, the method including: switching a coding order to either a fixed processing order or an adaptive processing order; coding image data items included in the moving picture according to the coding order switched to; and outputting the coded moving picture after including therein the coded image data items and first information for identifying whether the coding order is switched to the fixed processing order or the adaptive processing order. It is to be noted that the above-described switching is performed by the processing order determination unit 1201, and the outputting of the above-described first information is performed by the entropy coding unit 1202. With this, it is possible to increase coding efficiency and limit the number of circuits. Moreover, the image coding apparatus 1200 and the image coding method according to this embodiment perform entropy coding, but the above-described advantages can be achieved even without performing entropy coding. Moreover, the image coding method according to this embodiment may generate the bitstream (BS) by performing the processes corresponding to each of the above Variations 1 through 3 of Embodiment 1.

(Variation)

It is to be noted that the image coding apparatus 1200 according to Embodiment 2 may be realized having a configuration different than the configuration shown in FIG. 16.

Figure 18:
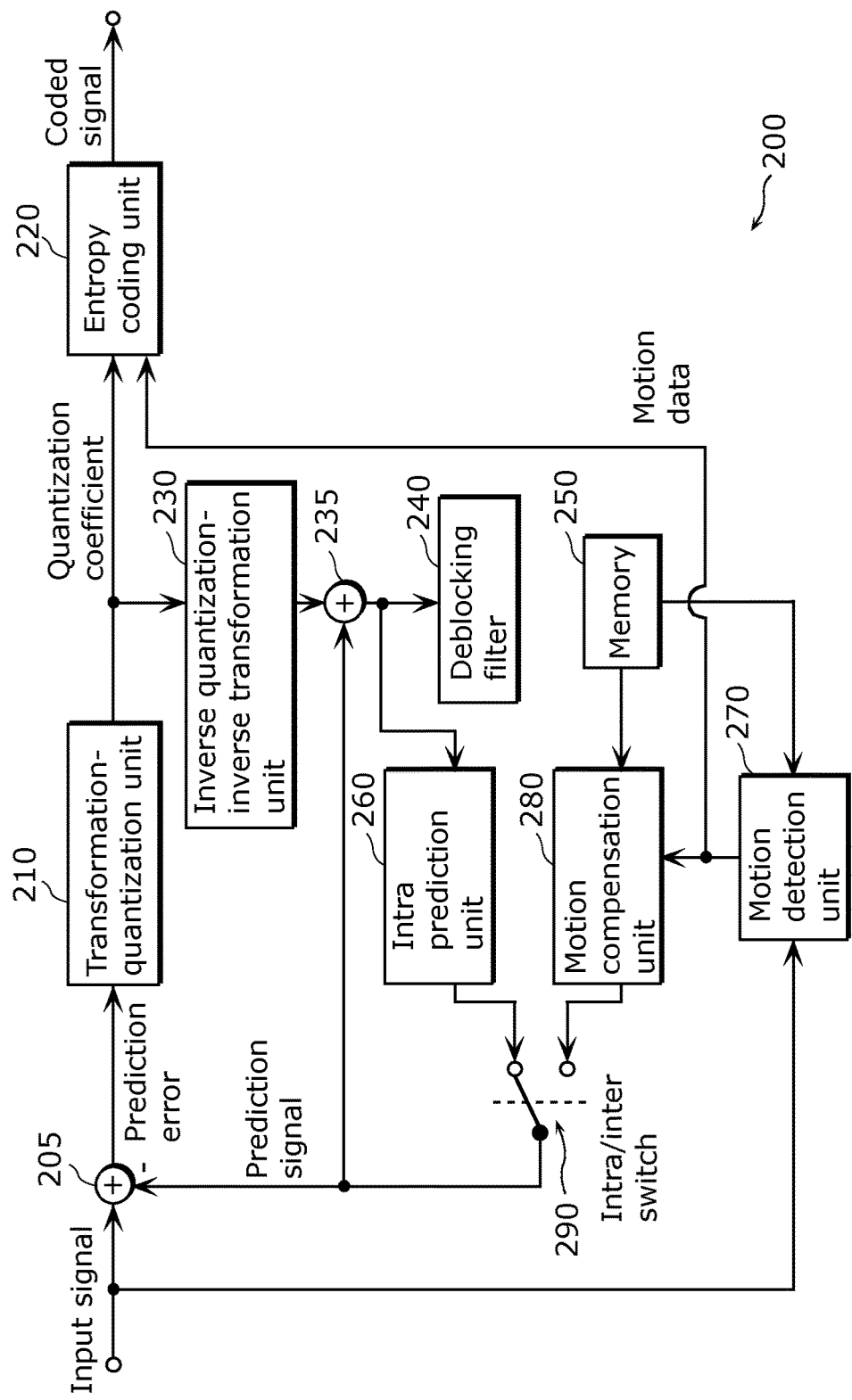
FIG. 18 is a block diagram showing an example of the structure of the image coding apparatus according to a variation of Embodiment 2.

FIG. 18 is a block diagram showing an example of the structure of an image coding apparatus 200 according to this variation.

As FIG. 18 shows, the image coding apparatus 200 includes a subtractor 205, a transformation-quantization unit 210, an entropy coding unit 220, an inverse quantization-inverse transformation unit 230, an accumulator 235, a deblocking filter 240, a memory 250, an intra prediction unit 260, a motion detection unit 270, a motion compensation unit 280, and a intra/inter switch 290.

Here, the entropy coding unit 220 includes the functions of the processing order determination unit 1201 and the entropy coding unit 1202 shown in FIG. 16. Moreover, in the image coding apparatus 200, the group of structural elements which include all of the structural elements excluding the entropy coding unit 220 corresponds to the coding unit 1203 shown in FIG. 16.

The subtractor 205 calculates the difference (prediction error) between the input signal (moving picture) and the prediction signal (prediction picture).

The transformation-quantization unit 210 generates frequency domain transform coefficients by transforming the prediction error for a spatial domain. The transformation-quantization unit 210, for example, generates transform coefficients by applying a discrete cosine transform (DCT) to the prediction error. Furthermore, the transformation-quantization unit 210 generates quantized coefficients by quantifying the transform coefficients.

The entropy coding unit 220 generates a coded signal (the bitstream (BS)) by variable-length coding the quantized coefficients. Moreover, the entropy coding unit 220 variable-length codes the motion data (motion vector, for example) detected by the motion detection unit 270, includes it in the coded signal, and outputs the signal.

The inverse quantization-inverse transformation unit 230 reconstructs the transform coefficients by inverse quantizing the quantized coefficients. Furthermore, the inverse quantization-inverse transformation unit 230 reconstructs a prediction error by inverse transforming the reconstructed transform coefficients. It is to be noted that the reconstructed prediction error loses information from quantization, so it is not the same as the prediction error generated by the subtractor 205. In other words, the reconstructed prediction error includes a quantification error.

The accumulator 235 generates a local decoded image by summing the reconstructed prediction error and the prediction signal.

The deblocking filter 240 applies a deblocking filter to the generated local decoded image.

The memory 250 is for storing reference images used in motion compensation. Specifically, the memory 250 stores, as references images, local decoded images to which a deblocking filter has been applied.

The intra prediction unit 260 generates a prediction signal (intra prediction signal) by performing intra prediction on the decoding target signal (coding target block) included in the input signal. Specifically, the intra prediction unit 260, from among local decoded images generated by the accumulator 235, refers to images around the coding target block (input signal) and generates an intra prediction signal by performing intra prediction on the coding target block.

The motion detection unit 270 detects motion data (motion vector, for example) between the coding target block and the reference image stored in the memory 250.

The motion compensation unit 280 generates a prediction signal (inter prediction signal) by performing motion compensation on the coding target block based on the detected motion data.

The intra/inter switch 290 selects either the intra prediction signal or the inter prediction signal, and outputs to the subtractor 205 and the accumulator 235 the selected signal as the prediction signal.

With the above configuration, the image coding apparatus 200 according to Embodiment 2 compression codes the moving picture. Moreover, with the image coding apparatus and the image coding method according to this embodiment, it is possible to generate a bitstream (BS) capable of being rapidly processed by the image decoding apparatus by transmitting information related to decoding order It is to be noted that in each of the above embodiments and their variations, each structural element is configured from dedicated hardware, but may be realized by executing a software program appropriate for each element. Each structural element may be realized as a result of a program execution unit of a CPU or processor or the like loading and executing a software program stored in a storage medium such as a hard disk or a semiconductor memory chip.

Here, software that realizes, for example, the image decoding apparatus according to the above-described Embodiment 1 and its variations, is a program as described below. This program causes a computer to execute switching of a decoding order to either a fixed processing order or an adaptive processing order based on first information included in the coded moving picture, and decoding of image data items included in the coded moving picture according to the decoding order switched to.

Here, software that realizes, for example, the image decoding apparatus according to the above-described Embodiment 2 and its variation, is a program as described below. This program causes a computer to execute switching of a coding order to either a fixed processing order or an adaptive processing order, coding of image data items included in the moving picture according to the coding order switched to, and outputting of the coded moving picture after including therein the coded image data items and first information for identifying whether the coding order is switched to the fixed processing order or the adaptive processing order.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 19:
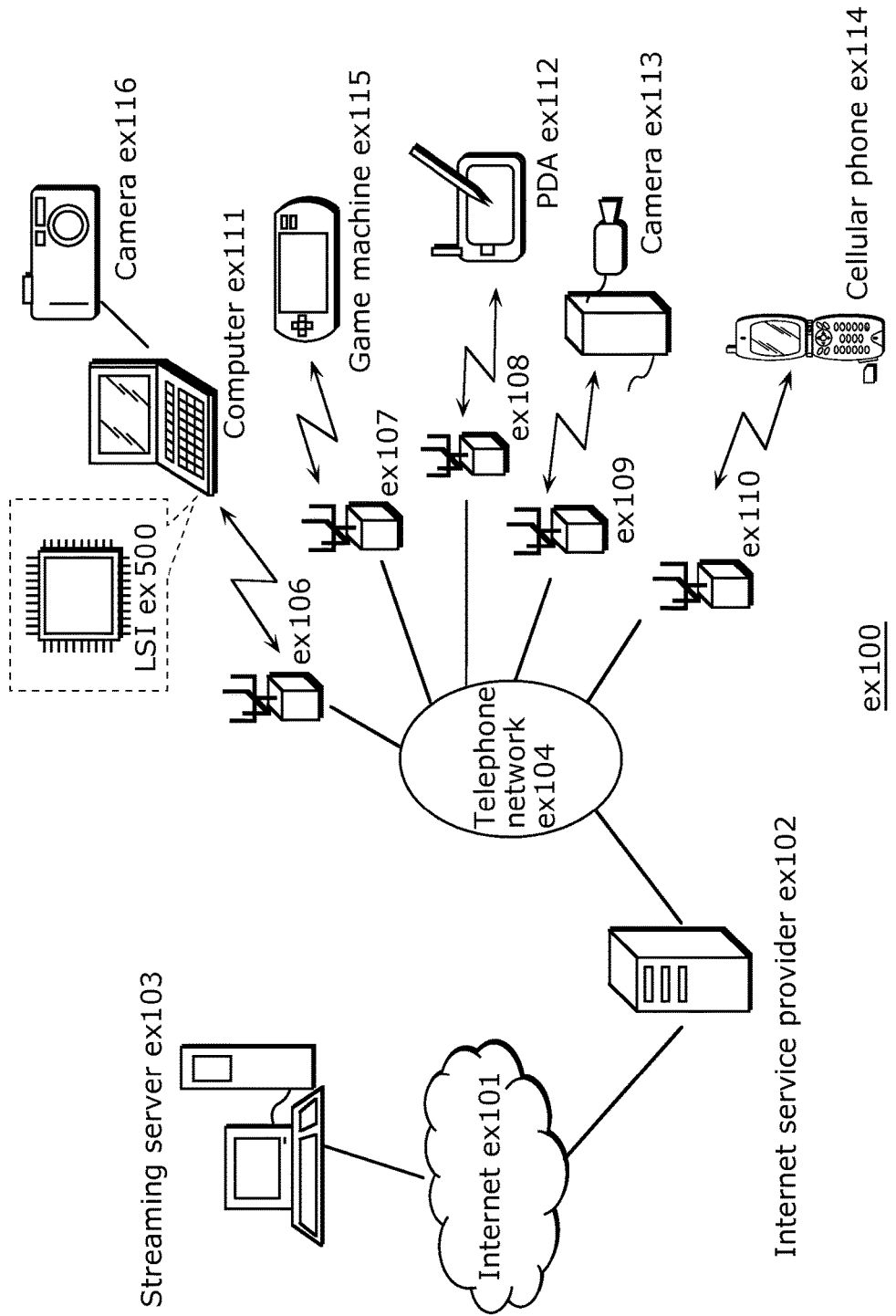
FIG. 19 shows an overall configuration of a content providing system for implementing content distribution services.

FIG. 19 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 19, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 20:
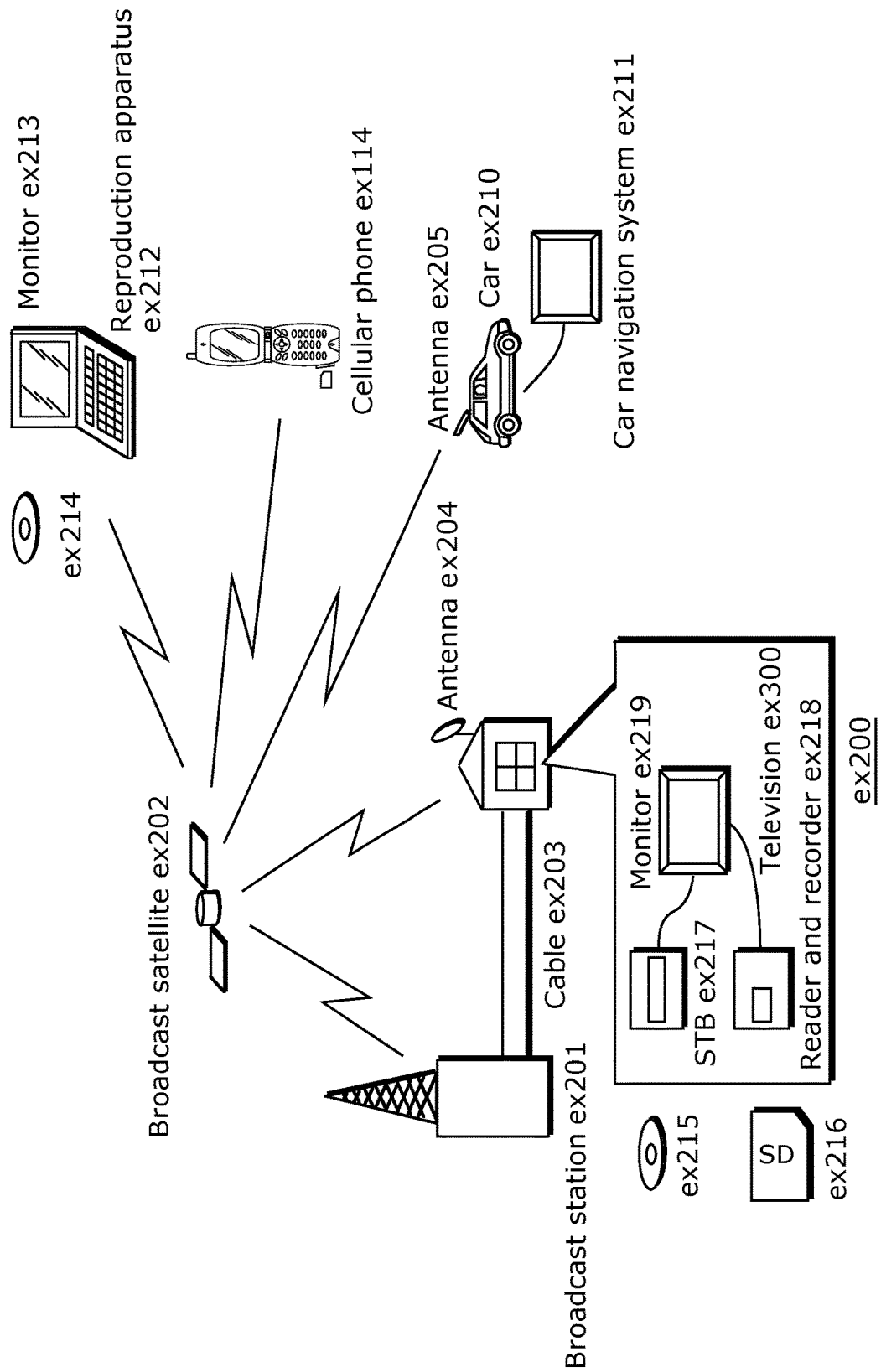
FIG. 20 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 20. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 21:
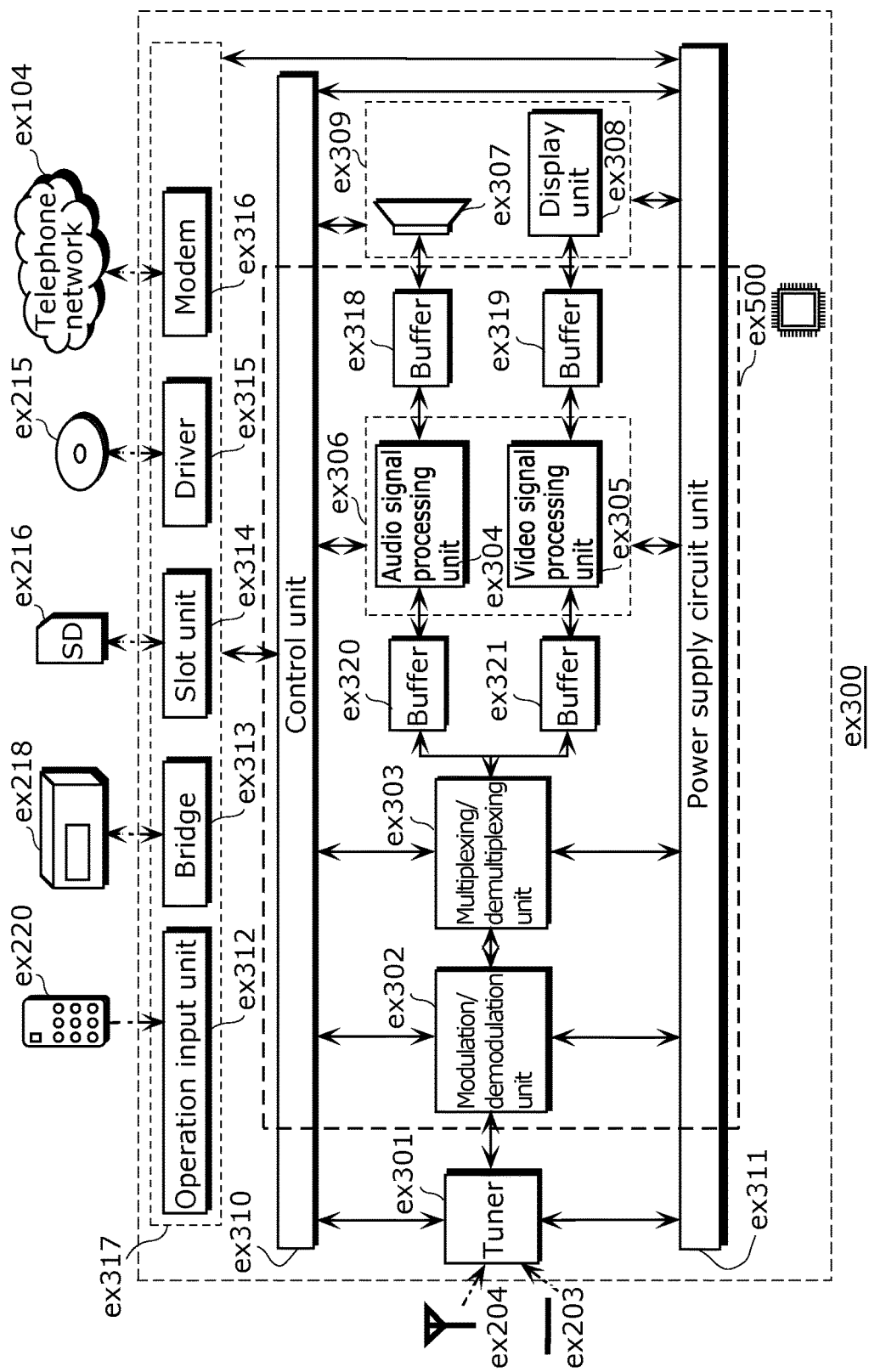
FIG. 21 shows a block diagram illustrating an example of a configuration of a television.

FIG. 21 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 22:
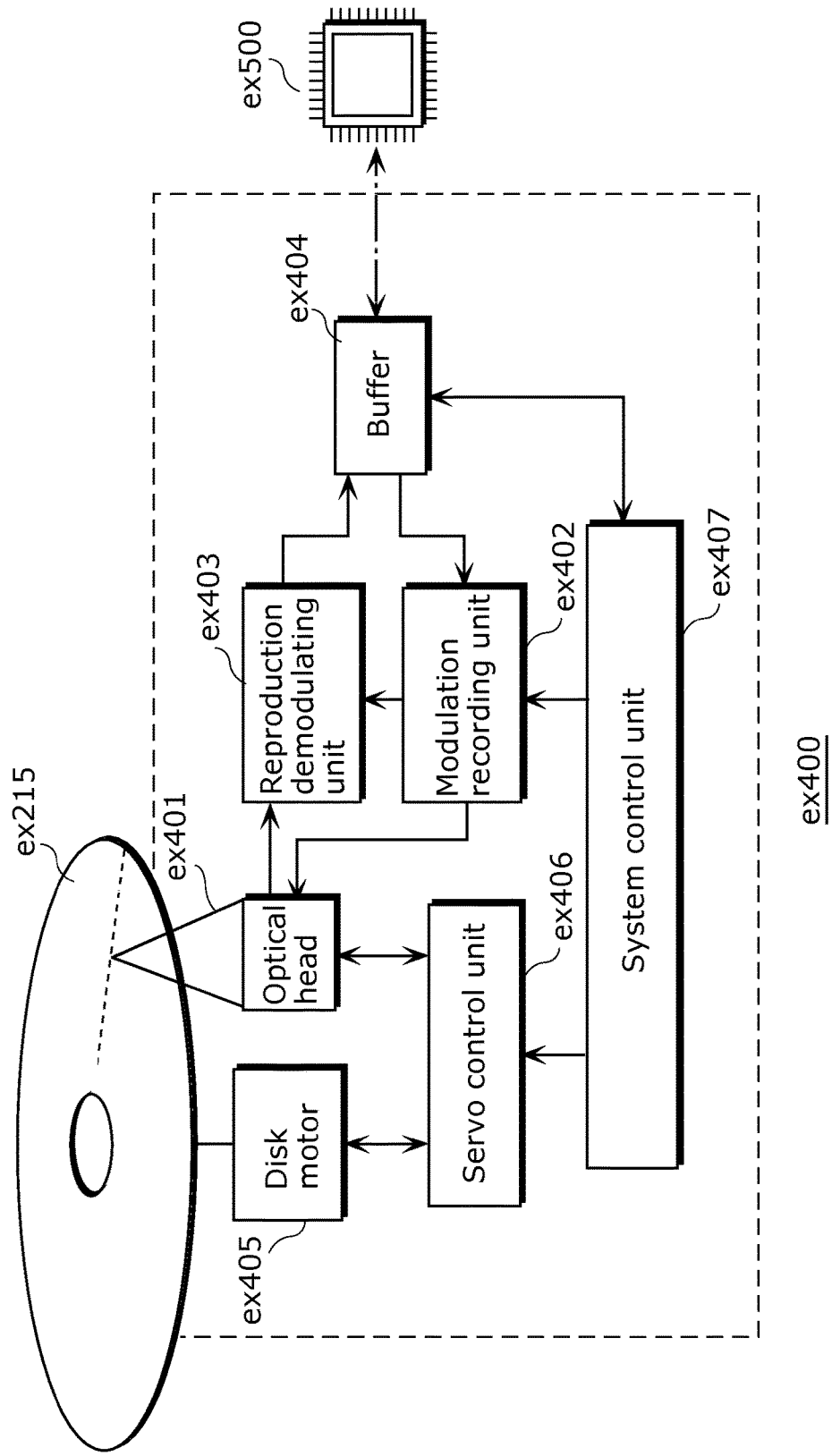
FIG. 22 shows a block diagram illustrating an example of a configuration of an information reproducing/recording unit that reads and writes information from and on a recording medium that is an optical disk.

As an example, FIG. 22 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 23:
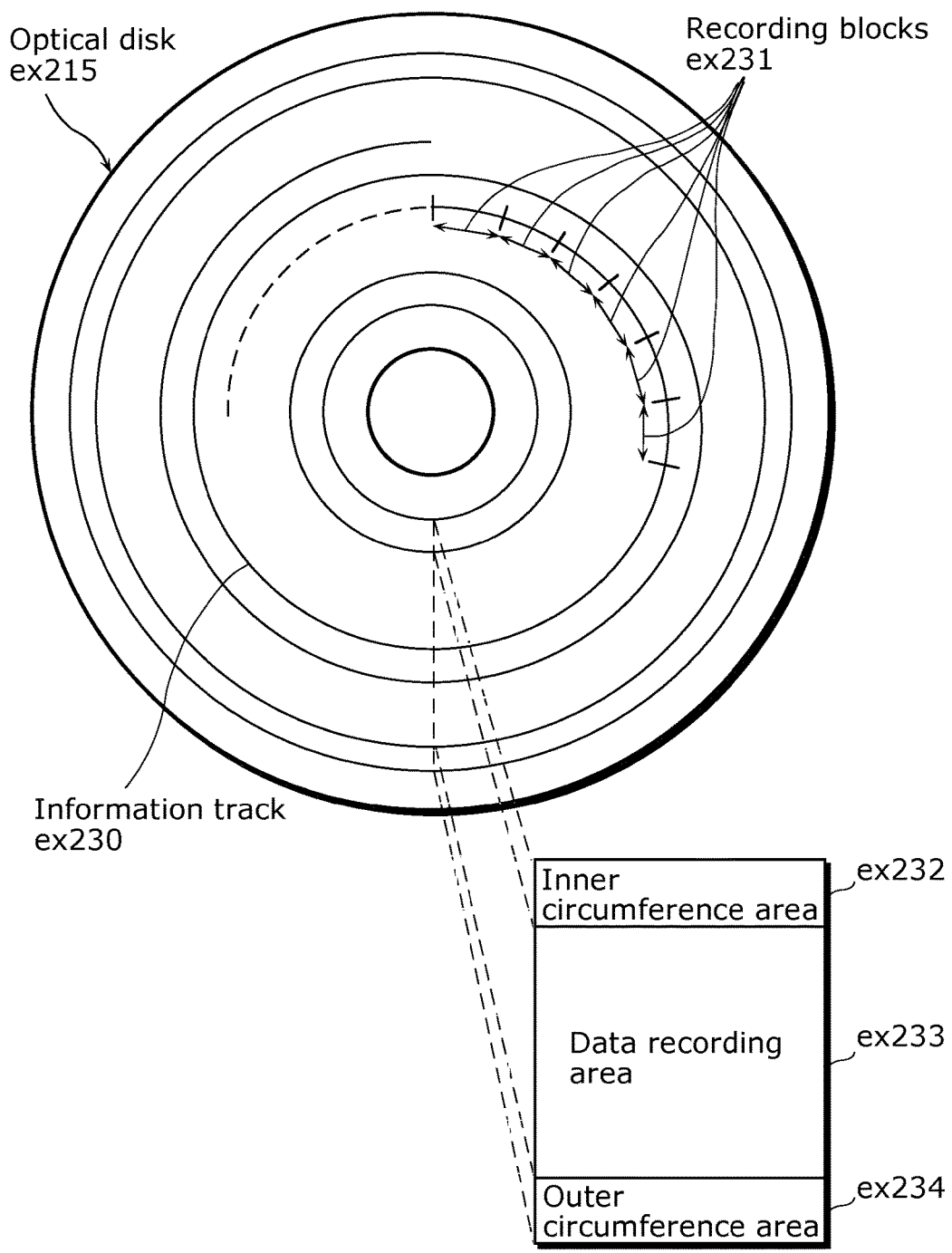
FIG. 23 shows an example of a configuration of a recording medium that is an optical disk.

FIG. 23 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 21. The same will be true for the configuration of the computer ex111, the cellular phone ex114, and others.

Figure 24A:
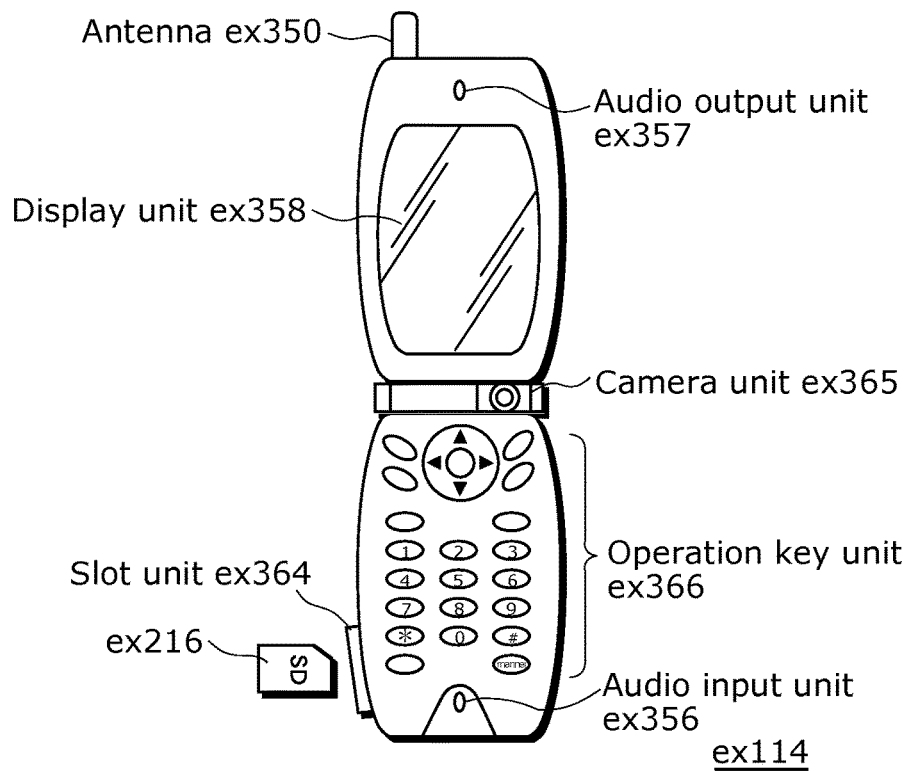
FIG. 24A shows an example of a cellular phone.

FIG. 24A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 24B:
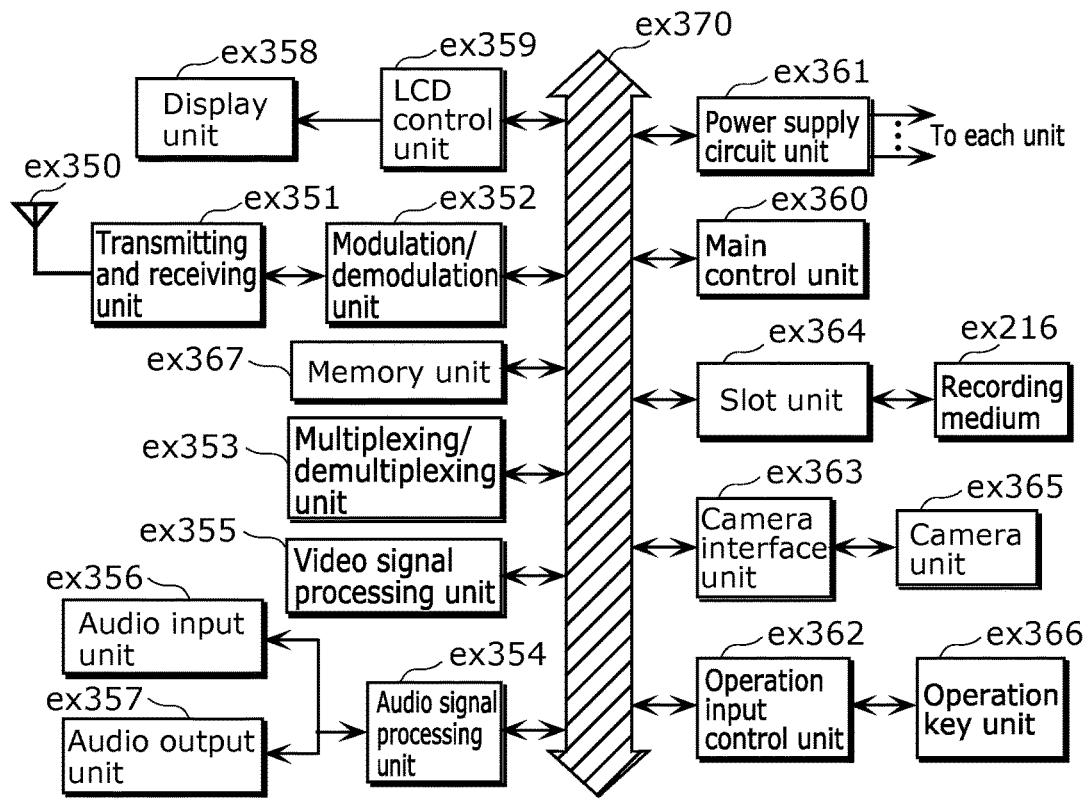
FIG. 24B is a block diagram showing an example of a configuration of a cellular phone.

Next, an example of a configuration of the cellular phone ex114 will be described with reference to FIG. 24B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video data onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 116 illustrates a structure of the multiplexed data. As illustrated in FIG. 116, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 26:
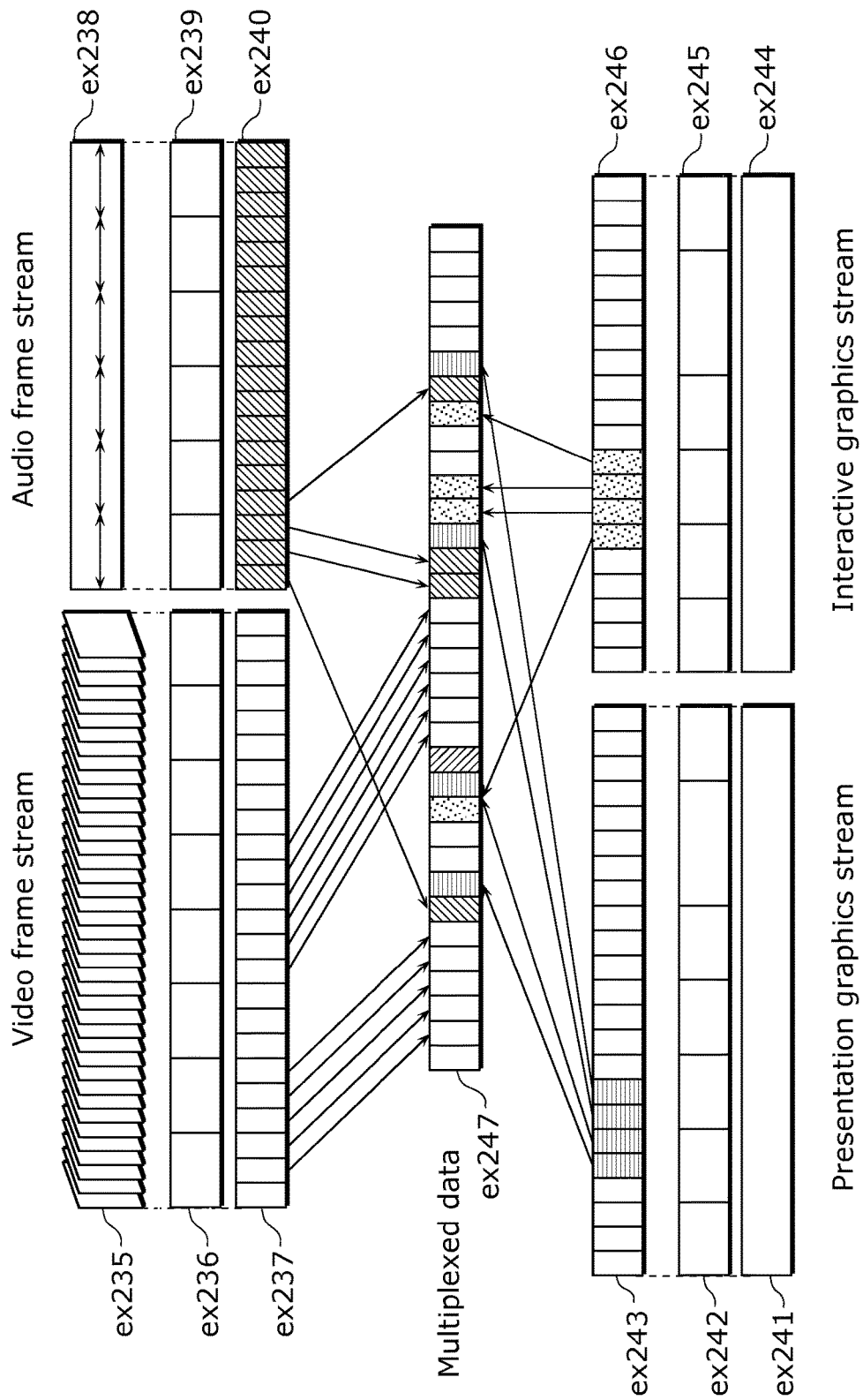
FIG. 26 schematically shows how each stream is multiplexed in multiplexed data.

FIG. 26 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 27:
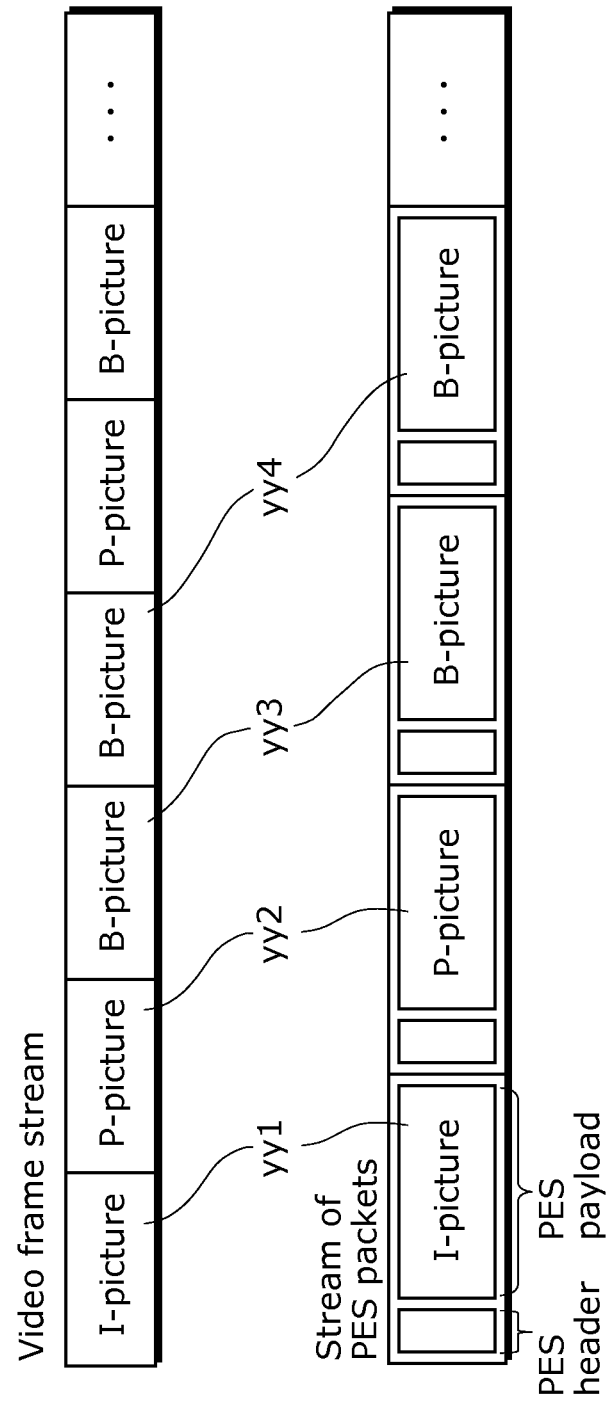
FIG. 27 shows how a video stream is stored in a stream of PES packets in more detail.

FIG. 27 illustrates how a video stream is stored in a stream of PES packets in more detail. The first bar in FIG. 27 shows a video frame stream in a video stream. The second bar shows the stream of PES packets. As indicated by arrows denoted as yy1, yy2, yy3, and yy4 in FIG. 27, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 28 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 28. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 29:
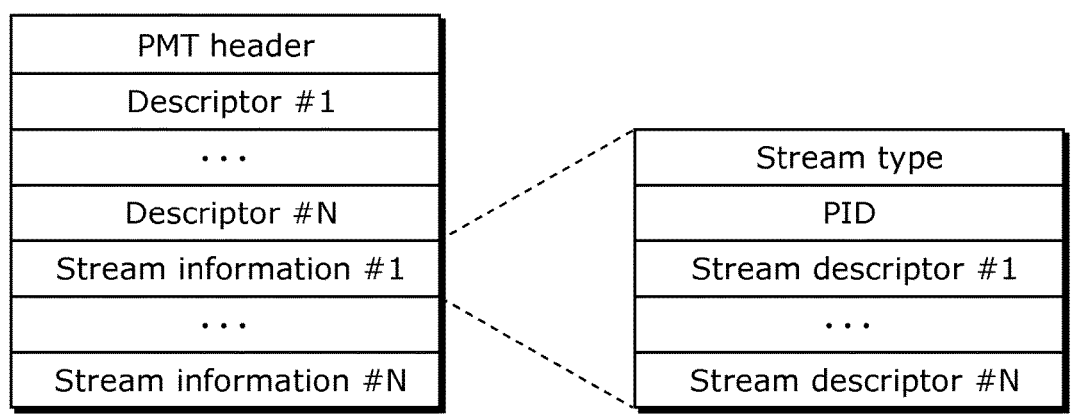
FIG. 29 shows a data structure of a PMT.

FIG. 29 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 30:
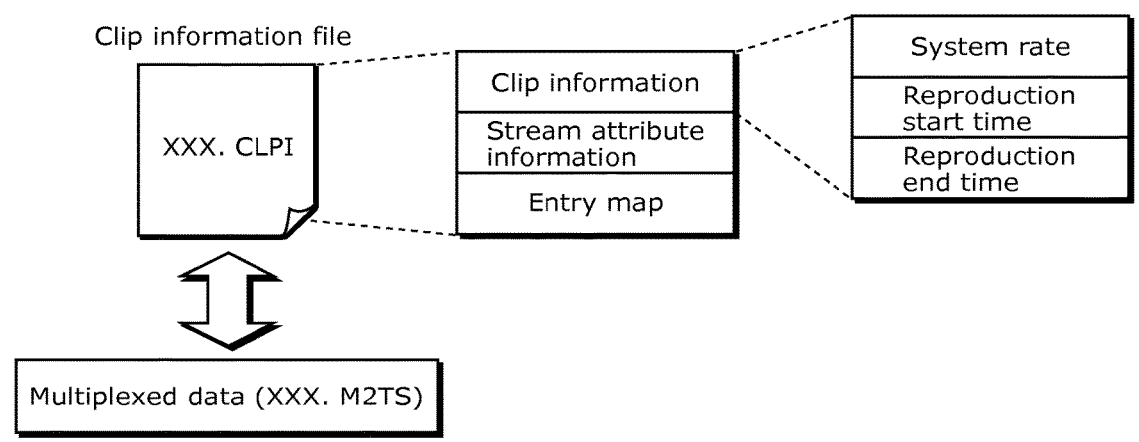
FIG. 30 shows an internal structure of multiplexed data information.

Each of the multiplexed data information files is management information of the multiplexed data as shown in FIG. 30. The multiplexed data information files are in one to one correspondence with the multiplexed data, and each of the files includes multiplexed data information, stream attribute information, and an entry map.

As illustrated in FIG. 30, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 31:
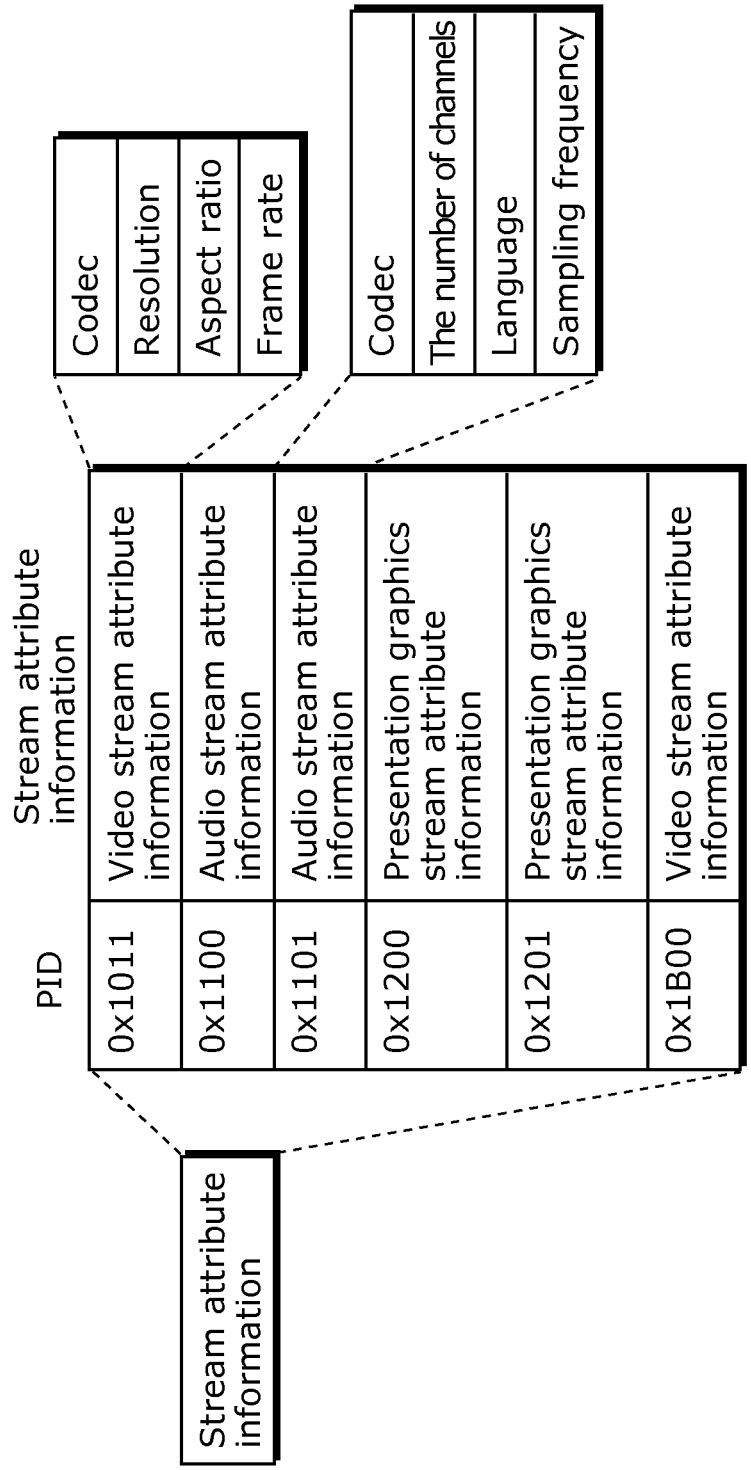
FIG. 31 shows an internal structure of stream attribute information.

As shown in FIG. 31, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 32:
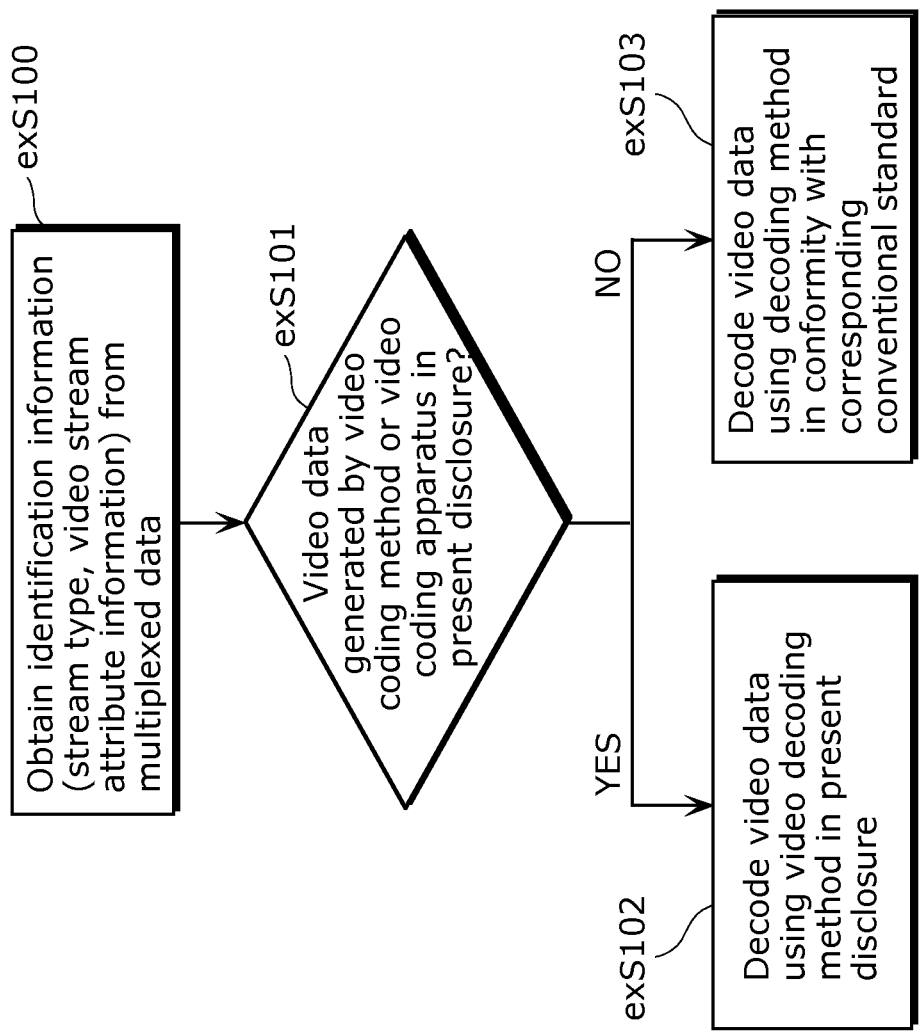
FIG. 32 shows steps for identifying video data.

Furthermore, FIG. 32 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 33:
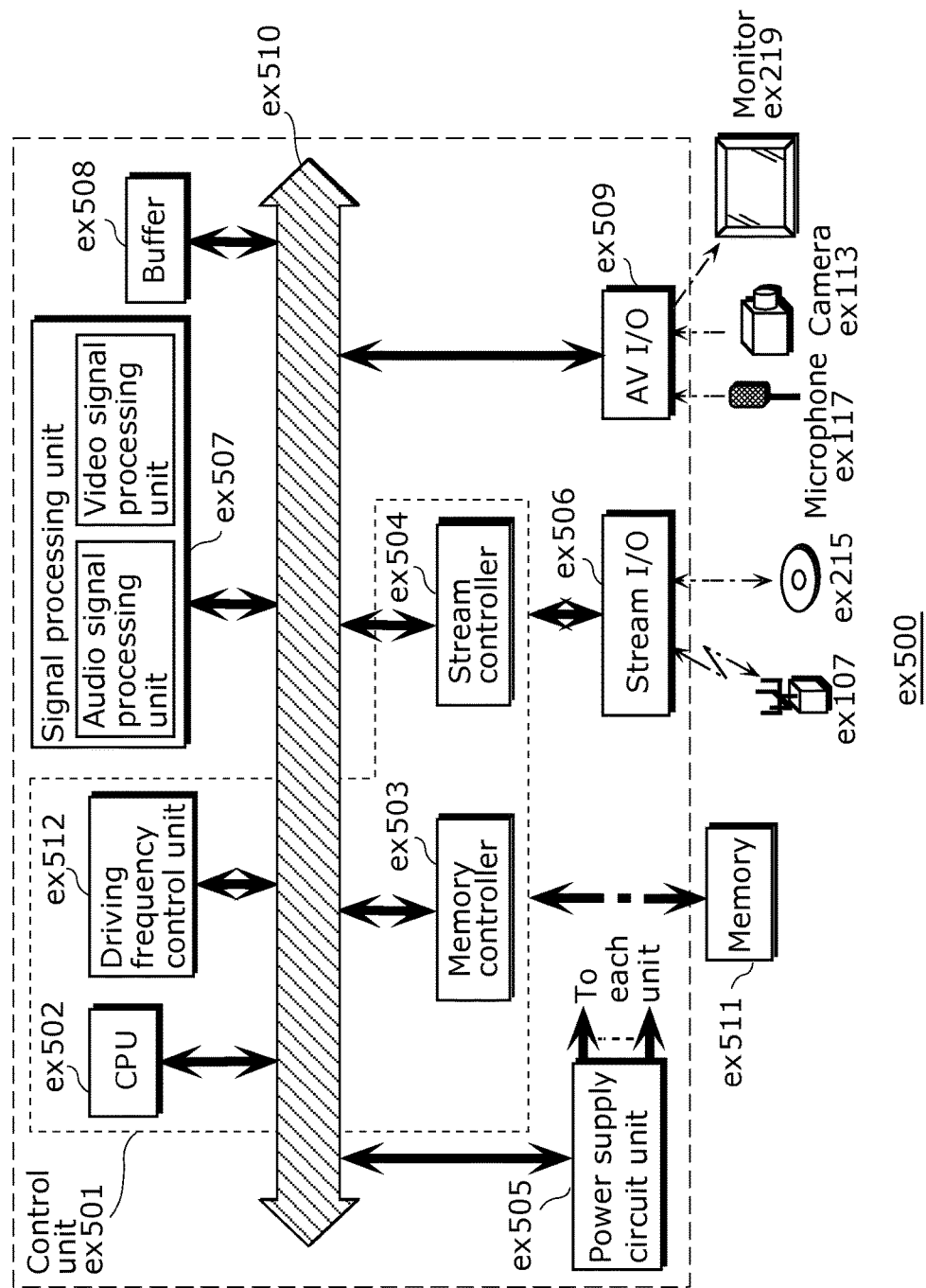
FIG. 33 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 33 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV JO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 34:
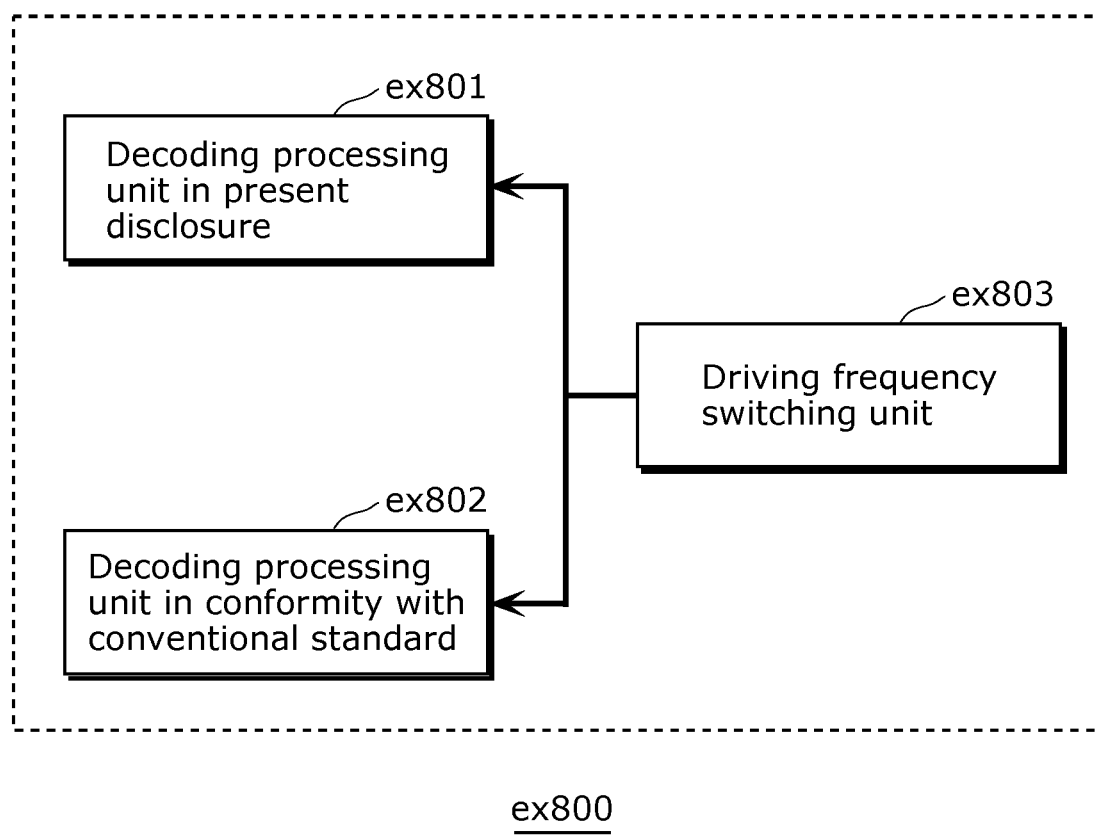
FIG. 34 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 34 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 33. Here, each of the decoding processing unit ex801 that executes the moving picture decoding method described in each of embodiments and the decoding processing unit ex802 that conforms to the conventional standard corresponds to the signal processing unit ex507 in FIG. 33. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 36. The driving frequency can be selected by storing the look-up table in the buffer ex508 and in an internal memory of an LSI, and with reference to the look-up table by the CPU ex502.

Figure 35:
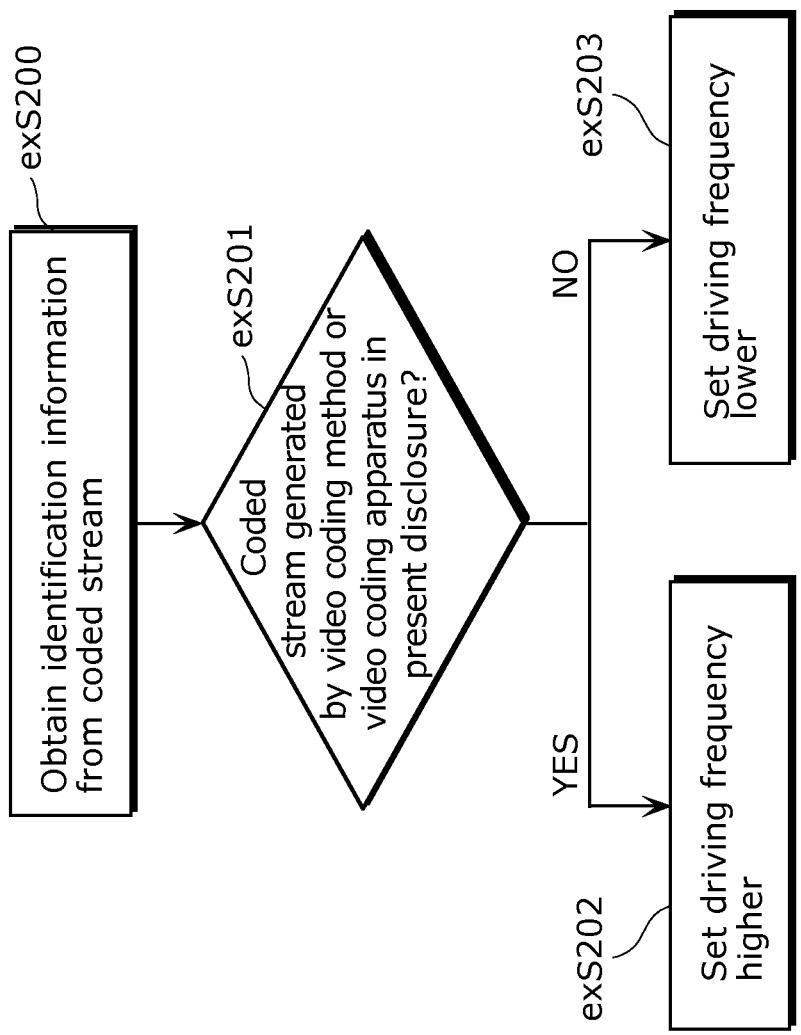
FIG. 35 shows steps for identifying video data and switching between driving frequencies.

FIG. 35 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 37A:
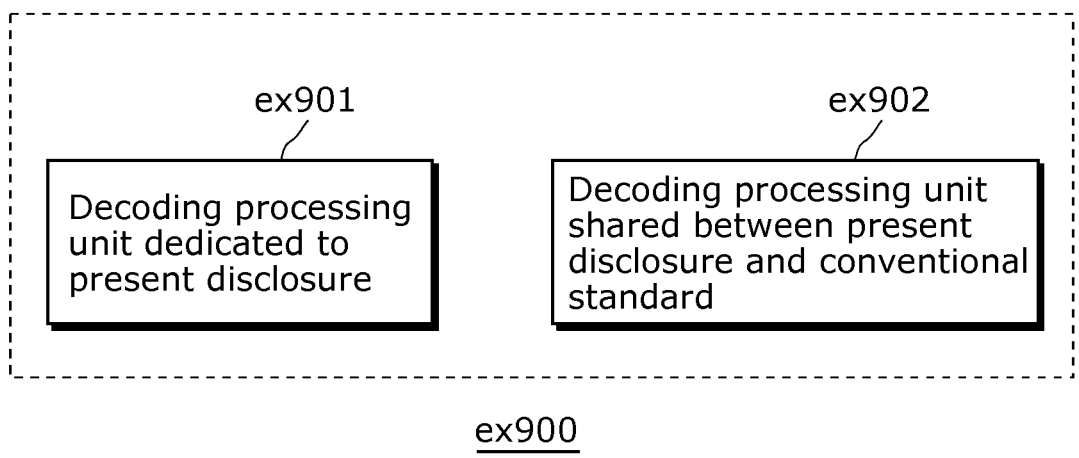
FIG. 37A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 37A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by inverse quantization in particular, for example, the dedicated decoding processing unit ex901 is used for inverse quantization. The decoding processing unit for implementing the moving picture decoding method described in each of embodiments may be shared for the processing to be shared, and a dedicated decoding processing unit may be used for processing unique to that of MPEG-4 AVC.

Figure 37B:
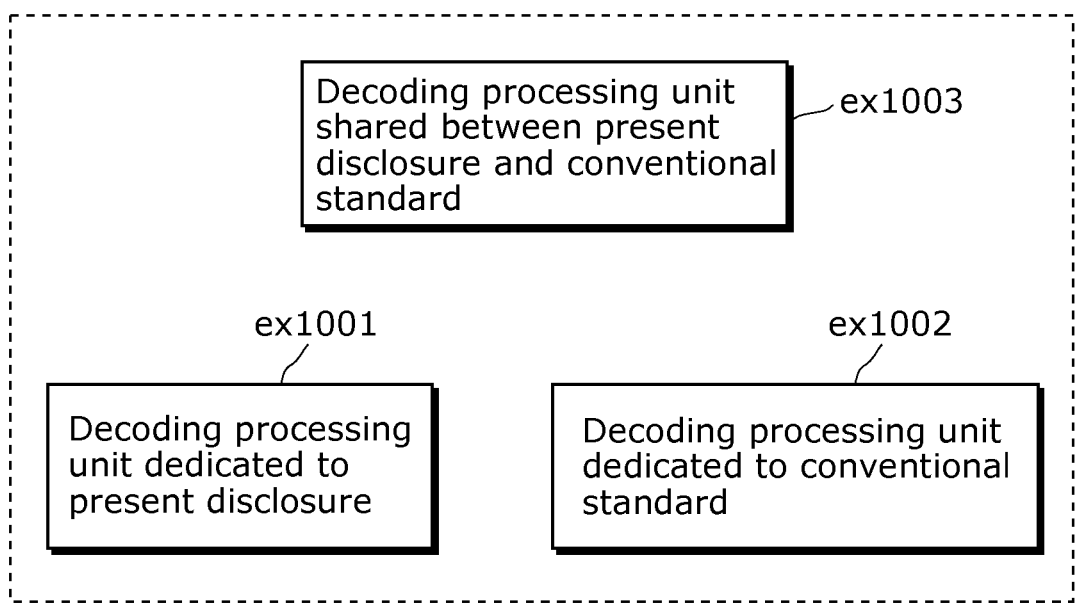
FIG. 37B is a diagram showing another example of a configuration for sharing a module of the signal processing unit.

Furthermore, ex1000 in FIG. 37B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

An image coding method and an image decoding method according to an aspect of the present disclosure are versatile in their applicability. For example, they are applicable to television sets, digital video recorders, car navigation systems, cellular telephones, digital cameras, digital video cameras and other devices which display information in high resolution and/or high resolution image capturing devices.

The invention claimed is:
1. An image decoding method for decoding a coded moving picture on a per coding unit basis, the method comprising:
 determining an adaptive processing order for decoding coding units included in the coded moving picture based on a largest size from among sizes of the coding units included in the coded moving picture, the coding units included in the coded moving picture being generated by dividing the coded moving picture, and the coding units included in the coded moving picture being image data;

switching a decoding order to either a fixed processing order or the determined adaptive processing order based on first information included in the coded moving picture, the decoding order being an order in which the coding units included in the coded moving picture are decoded; and decoding the coding units included in the coded moving picture according to the decoding order switched to.

2. The image decoding method according to claim 1, wherein in the decoding, when the decoding order is switched to the fixed processing order in the switching, the coding units included in the coded moving picture are decoded according to a processing order defined by a predetermined processing unit, without using second information for identifying a largest coding unit.

3. The image decoding method according to claim 2, wherein in the decoding, when the decoding order is switched to the fixed processing order in the switching, the coding units included in the coded moving picture are decoded according to a processing order defined by a predetermined processing unit, without using the second information or third information for identifying a smallest coding unit.

4. The image decoding method according to claim 1, wherein the first information is information that indicates a profile of the coded moving picture to prompt switching between at least two or more parameters, and in the switching, the at least two or more parameters are switched between in addition to the decoding order.

5. The image decoding method according to claim 1, wherein the first information is size information that defines a decoding order, and in the decoding, the coding units included in the coded moving picture are decoded according to a processing order unrestricted by a largest coding unit and defined by the size information.

6. An image coding method for coding a moving picture on a per coding unit basis to generate a coded moving picture, the method comprising:

determining an adaptive processing order for coding coding units included in the moving picture based on a largest size from among sizes of the coding units included in the moving picture, the coding units included in the moving picture being generated by dividing the moving picture, and the coding units included in the moving picture being image data;

switching a coding order to either a fixed processing order or the determined adaptive processing order, the coding order being an order in which the coding units included in the moving picture are coded;

coding the coding units included in the moving picture according to the coding order switched to; and outputting the coded moving picture after including therein the coded coding units and first information for identifying whether the coding order is switched to the fixed processing order or the determined adaptive processing order.

7. The image coding method according to claim 6, wherein in the outputting, when the coding order is switched to the fixed processing order in the switching, second information for identifying a largest coding unit is prohibited from being included in the coded moving picture.

8. The image coding method according to claim 7, wherein in the outputting, when the coding order is switched to the fixed processing order in the switching, in addition to the second information, third information for identifying a smallest coding unit is prohibited from being included in the coded moving picture.

9. The image coding method according to claim 6, wherein in the outputting, information that indicates a profile of the coded moving picture to prompt switching between at least two or more parameters is outputted as the first information.

10. The image coding method according to claim 6, wherein the first information is size information that defines a coding order, and in the coding, the coding units included in the coded moving picture are coded according to a processing order unrestricted by a largest coding unit and defined by the size information.

11. An image decoding apparatus that decodes a coded moving picture in accordance with the image decoding method according to claim 1.

12. An image coding apparatus that codes a moving picture in accordance with the image coding method according to claim 6.

13. An image coding and decoding apparatus comprising:

an image coding apparatus that codes a moving picture on a per coding unit basis to generate a coded moving picture; and an image decoding apparatus that decodes the coded moving picture on a per coding unit basis, wherein the image coding apparatus codes the moving picture in accordance with the image coding method according to claim 6, and the image decoding apparatus includes:

determining an adaptive processing order for decoding coding units included in the coded moving picture based on a largest size from among sizes of the coding units included in the coded moving picture, the coding units included in the coded moving picture being generated by dividing the coded moving picture, and the coding units included in the coded moving picture being image data;

a switching unit configured to switch a decoding order to either a fixed processing order or the determined adaptive processing order based on first information included in the coded moving picture, the decoding order being an order in which the coding units included in the coded moving picture are decoded; and a decoding unit configured to decode the coding units included in the coded moving picture according to the decoding order switched to.

* * * * *